US012739166B2

(12) United States Patent
Chordiya et al.

(10) Patent No.: US 12,739,166 B2
(45) Date of Patent: Sep. 15, 2026

(54) UNIFIED CONFIGURATION OF HETEROGENEOUS NETWORK DEVICES

(71) Applicant: HEWLETT PACKARD ENTERPRISE DEVELOPMENT LP, Spring, TX (US)

(72) Inventors: Pankaj Chordiya, San Jose, CA (US); Piyush Agarwal, San Jose, CA (US); Senthil Kumar Veeraswamy Santhanam, San Jose, CA (US); Lakhan Gupta, San Jose, CA (US); Cameron Wilson, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/968,812

(22) Filed: Dec. 4, 2024

(65) Prior Publication Data

US 2026/0156027 A1 Jun. 4, 2026

(51) Int. Cl.
*H04L 41/0803* (2022.01)

(52) U.S. Cl.
CPC ................................ *H04L 41/0803* (2013.01)

(58) Field of Classification Search
CPC .................................................. H04L 41/0803
See application file for complete search history.

(56) References Cited

U.S. PATENT DOCUMENTS

2006/0080425 A1* 4/2006 Wood .................. H04L 67/1095 709/223
2016/0352569 A1* 12/2016 Galliher, III ............ H04L 41/12
2020/0374196 A1* 11/2020 Powell ................ H04L 41/0843

OTHER PUBLICATIONS

Bierman et al., "Yang Data Structure Extensions," Jun. 2020, Internet Engineering Task Force (IETF), Request for Comments: 8791, <https://www.rfc-editor.org/rfc/rfc8791.pdf>., 6 pages.
Lhotka et al., "Defining and Using Metadata with Yang", Request for Comments: 7952, Aug. 2016, 19 pages.
Wikipedia, "DMS Software Reengineering Toolkit," available online at <https://en.wikipedia.org/w/index.php? title=DMS_Software_Reengineering_Toolkit&oldid=1091089633>, Jun. 2, 2022, 3 pages.

(Continued)

*Primary Examiner* — Anh Nguyen
(74) *Attorney, Agent, or Firm* — Hewlett Packard Enterprise Patent Department

(57) ABSTRACT

Examples disclosed herein relate to providing unified configuration of heterogeneous devices in a network. A request in a unified configuration format to configure a parameter of a device in a network may be received at a system. The system identifies a network device targeted by the request. Based on a command mapping, one or more commands usable to change a setting of the parameter at the target network device may be determined, and based on a command hierarchy, an order for the one or more commands may be determined. The system arranges the commands in the determined order to produce a command block having a device-specific configuration format for the target network device and causes the parameter to be set at the target network device. Based on the request, the system may further produce a command block having a second device-specific configuration format for a second device.

20 Claims, 9 Drawing Sheets

(56) References Cited

OTHER PUBLICATIONS

Wikipedia, “Oasis Tosca”, available online at <https://en.wikipedia.org/w/index.php? title=OASIS_TOSCA&oldid=1253916197>, Oct. 28, 2024, , 5 pages.

Wikipedia, “Progress Chef”, available online at <https://en.wikipedia.org/w/index.php? title=Progress_Chef&oldid=1243259932>, Aug. 31, 2024, 5 pages.

Wikipedia, “Puppet (software)”, available online at <https://en.wikipedia.org/w/index.php?title=Puppet_(software) &oldid=1253045291>, Oct. 24, 2024, 4 pages.

Wikipedia, “Source-to-source compiler,” Nov. 20, 2024, <https://en.wikipedia.org/w/index.php?title=Source-to-source_compiler&oldid=1258560169>, 23 pages.

Wikipedia, “Yang,”, available online at <https://en.wikipedia.org/w/index.php?title=YANG&oldid=1253978519>, Oct. 28, 2024, 9 pages.

* cited by examiner

FIREWALL CONFIGURATION REQUEST 502

```
aruba-policy:policies {
  "name": "PolicyX",
    "security-policy": {
      "policy-rule": [
      {
        "action": {
          "type": "ACTION_ALLOW"
        },
        "condition": {
          "destination": {
            "type":"ADDRESS_HOST",
            "host-address": {
              "host-ipv4-address":
"192.7.0.2"
            }
          },
          "rule-type":
"RULE_APP_CATEGORY",
          "services": {
            "app-category": "ANTIVIRUS"
          }
        },
        "position": 1
      },
      {
        "action": {
          "type": "ACTION_DENY"
        },
        "condition": {
          "services": {
            "net-service": "aaa-ns"
          },
          "rule-type":
"RULE_NET_SERVICE",
          "destination": {
            "type":"ADDRESS_HOST",
            "network-address": {
              "network-ipv4-address":
"192.168.0.0/16"
            }
          }
        },
        "position": 2
      }
      ]
    }
}
```

FIRST FIREWALL COMMAND BLOCK 504A

"policy PolicyX",
"rule 192.7.0.2 255.255.255.255 match appcategory antivirus permit ",
"rule 192.168.0.0 255.255.0.0 match net-service aaa-ns deny",

SECOND FIREWALL COMMAND BLOCK 504B

"ip access-list session PolicyX"
"any host 192.7.0.2 appcategory antivirus permit position 1"
"any network 192.168.0.0 255.255.0.0 aaa-ns deny position 2"

*FIG. 5*

RULE SET 708

```
“src”: {
  "name": "src",
  "type": “union”,
  “type_info”: {
    “name”: “src-type”,
    “module”: “aruba-interface-tunnel”,
    “type”: “union”,
    “path”: “SW,GW”
  },
  “metadata”: [
    {
      “CmdExt”: {
        “index”: 3,
        “cmd”: “source ip $src”,
        “force_rest”: true
      },
      “Cookie”: null
    },
    null,
    {
      “CmdExt”: {
        “index”: 3
        “cmd”: “tunnel source $src”
      },
      “Cookie”: null
    },
    null
  ]
}
```

*FIG. 7*

COMMON CONFIGURATION MODEL 802

```
{
  container tunnel {
    list interface {
      cmd-ext:cx '{"index": 1}';
      key "id";
      leaf id {
        cmd-ext:switch '{"custom_func": "TunnelNameHandler", "index": 1,
"new_ctx": "interface_tunnel_node"}';
        cmd-ext:gateway '{"custom_func": "GwTunnelNameHandler", "index": 1}';
      }
      leaf enabled {
        cmd-ext:switch '{"binary_cmd": [{"true": "no shutdown", "false":
"shutdown"}], "force_rest": true, "index": 2}';
        cmd-ext:gateway '{"binary_cmd": [{"true": "no shutdown", "false":
"shutdown"}], "index": 2}';
      }
      leaf src {
        cmd-ext:switch '{"cmd": "source ip $src", "force_rest": true, "index":
3}';
        cmd-ext:gateway '{"cmd": "tunnel source $src", "index": 3}';
      }
      leaf dst {
        cmd-ext:switch '{"cmd": "destination ip $dst","force_rest": true, "index":
4}';
        cmd-ext:gateway '{"cmd": "tunnel destination $dst", "index": 4}';
      }
      leaf ipv4-prefix {
        cmd-ext:switch '{"cmd": "ip address $ipv4-prefix","force_rest": true,
"index":5}';
        cmd-ext:gateway '{"cmd":"ip address $ipv4-address $ipv4-subnet-mask",
"del_cmd": "no ip address", "index": 5}';

      }
      leaf acl-name {
        cmd-ext:switch '{"cmd":"ip multicast boundary access-list $name", "index":
6, "force_rest": true}';
        cmd-ext:gateway '{"cmd": "ip access-group in $name", "del_cmd": "no ip
access-group in", "index": 6}';
      }
    }
  }
}
```

*FIG. 8*

UNIFIED CONFIGURATION OF HETEROGENEOUS NETWORK DEVICES

BACKGROUND

Enterprise network deployments include a wide range of networking devices, such as layer-2 switches, layer-3 switches, branch gateways, wireless access points, wide area network (WAN) gateways, and the like. These networking devices may be configured to meet specific requirements or perform certain functions within a network. Configuration is a process of setting or selecting the operating or configuration parameters of network devices, such as network operating protocols and security keys, so that the network device is able to properly connect to, operate on, or provide connectivity within the network.

BRIEF DESCRIPTION OF THE DRAWINGS

The following detailed description references the drawings, wherein:

FIG. 5 depicts an example configuration request and example command blocks for setting a common parameter at multiple different network devices, according to an example;

FIG. 7 depicts an example rule set associated with a parameter, according to an example;

FIG. 8 depicts an example common configuration model, according to an example.

Figure 1:
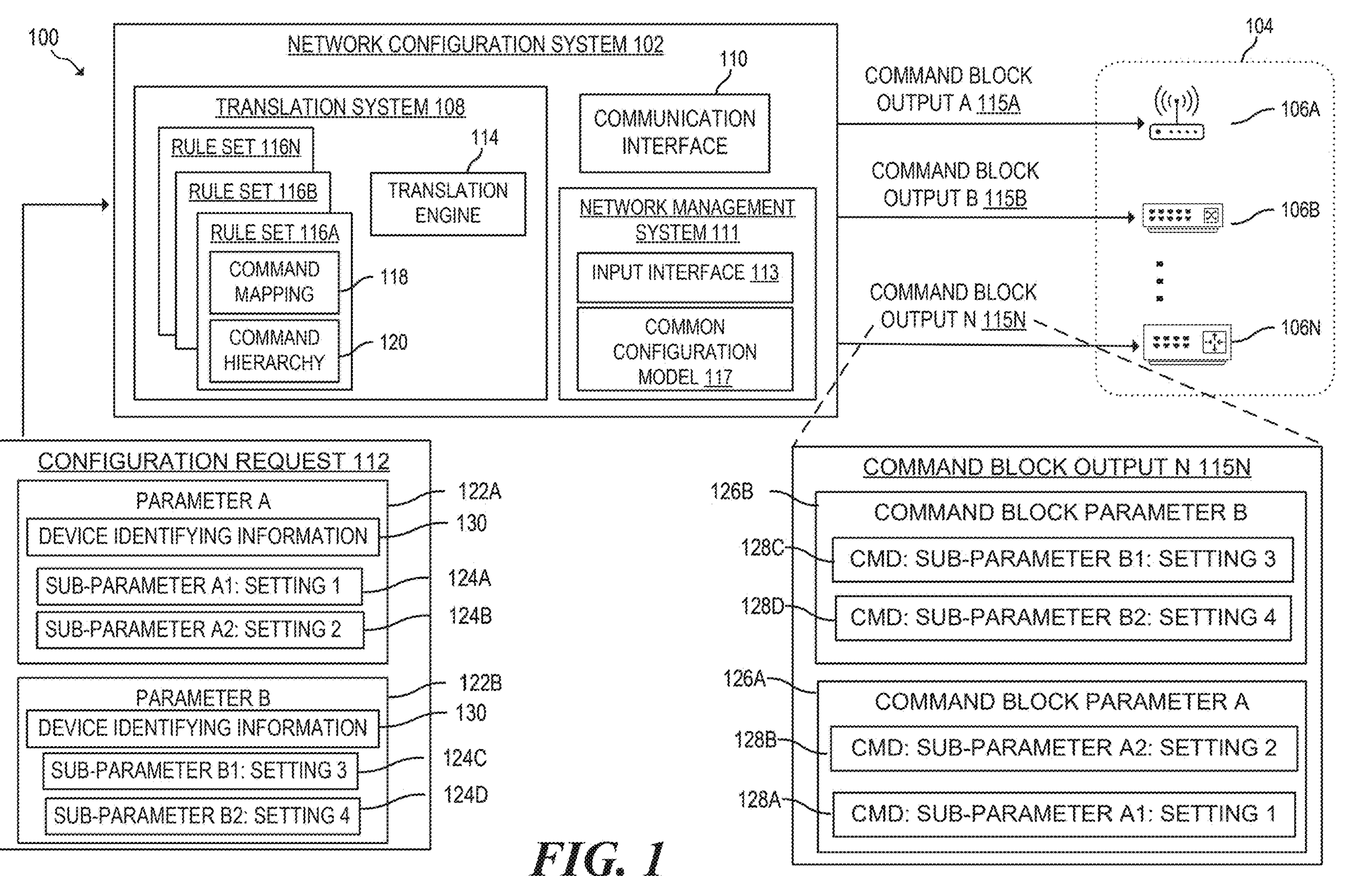
FIG. 1 is a block diagram illustrating an example of a system for providing unified configuration of heterogeneous devices in a network, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Network deployments often include heterogeneous devices, which may vary across device type (e.g., a gateway versus a switch) and/or vendor of the device. These devices may also vary in terms of the operating systems they support and the method used to configure their parameters. More specifically, devices may support different configuration formats, which as described herein, relate to the commands accepted by a device to configure a parameter. Configuration formats may vary in one or more of the command type, order, language, or the like accepted to set or modify a device parameter. For example, devices of different types (e.g., a gateway versus a switch), as well as device of the same type (e.g., two gateways) but having different vendors, may use different configuration formats from one another. Even configuration parameters that are common across different types of devices (e.g., a tunnel configuration parameter utilized by both switches and gateways) may also vary in configuration formats. For instance, setting a tunnel configuration parameter to create a tunnel between a switch and a gateway may involve setting the parameter according to a first format on the gateway and separately setting the parameter according to a different, second format on the switch. With a growing number of heterogeneous devices added to a network, configuring the devices across the network thus becomes increasingly cumbersome. There is an increasing number of configuration formats for network administrators to learn, and configuration time and costs increase when parameters are set on different devices utilizing distinct configuration formats.

Some methods and modeling languages such as Yet Another Next Generation (YANG), Topology and Orchestration Specification for Cloud Applications (TOSCA), Chef, and Puppet may be used to represent network devices and their configuration. These approaches offer types of unified configuration for different devices in a network that may be used rather than separate configuration. However, the usefulness of these approaches is limited by the fact that network devices' operating systems and applications are designed to accept configuration in proprietary formats. As a result, in order to utilize a model like YANG for the unified configuration of two devices that initially support different configuration formats, the operating systems and/or applications of the devices must be adapted to accept a unified configuration format. Yet, upgrading device hardware and/or device firmware across an entire network to support a common configuration format is costly in terms of both time and resources.

To address these issues, examples described herein relate to providing unified configuration of heterogeneous devices in a network such that a single configuration format may be used to configure devices supporting different configuration formats without upgrading device hardware or firmware to support a common configuration format. Moreover, examples relate to enabling the configuration of these devices via a single workflow (e.g., with a single configuration request). The unified configuration may be achieved with a translation engine that utilizes a rule set to translate a request for configuring a device parameter (such a request may be referred to herein as a "configuration request") from a first format to a second format. For example, configuration requests may be formatted according to a unified configuration format, and the translation engine may translate these requests into the various device-specific configuration formats accepted by the respective devices to be configured in response to the configuration request. The translation engine may thus produce commands suitable to configure a parameter at a target network device.

As described herein, the term "unified configuration format" may relate to a common (e.g., shared) configuration format that may be used to configure network devices having various device-specific configuration formats (e.g., proprietary formats). As described herein, the term "command" may relate to text, code, or a script useable for configuration of a device. A command may be a configuration line or a portion thereof, for example. The term "configure" may relate to changing, setting, or initializing a device parameter. Further, the terms "device parameter" and "parameter" may be used interchangeably and may relate to a feature or functionality of a device that may be set to different values. A device parameter may include multiple sub-parameters, or elements. In some cases, for example, a parameter may include a hierarchical structure (e.g., a tree structure) of sub-parameters, sub-parameters of sub-parameters, and so forth, as described in greater detail below. As described herein, the terms "configuration element" and "network configuration element" may relate to a device parameter or any sub-parameter included in a hierarchy associated with a parameter. Configuring a device parameter may involve setting various sub-parameters to different values, which may involve the use of one or more commands. For instance, configuring a tunnel parameter to create a tunnel for a switch may involve setting at least two sub-parameters: (1) a source internet protocol address (IP) and (2) a destination IP address for the tunnel. In some cases, a first command, such as a command-line interface (CLI) command, may set the source IP address for the tunnel, and a second command may set the destination IP address for the tunnel. Moreover, as described herein, the term "setting" may relate to a particular state or combination of value(s) for a parameter. In this regard, changing a setting of a parameter may involve changing a value of the parameter, changing a value of a sub-parameter of the parameter, or a combination thereof.

In addition to using proper commands to set parameter or sub-parameter values, successful configuration of a device parameter may depend on a proper ordering of commands. As an illustrative example, proper configuration of the tunnel for the switch may involve setting the source IP address before setting the destination IP address. Errors in either the commands themselves or in the order of the commands for a parameter may result in a failed configuration of that parameter. Accordingly, a device-specific configuration format may dictate both the particular commands used (e.g., command syntax), as well as the order (e.g., sequence) the commands are arranged in, to perform a configuration.

In examples described herein, the translation engine may determine the syntax and arrangement of commands for configuring a device parameter at a target network device based on a rule set. A rule set may, via a command mapping, map a request to configure a device parameter from a first syntax to a second syntax. For instance, the command mapping may map a request to configure a device parameter from the unified configuration format to one or more command(s) in a device-specific configuration format, such as a CLI command corresponding to a target network device. Accordingly, the translation engine may use the command mapping to determine a set of commands suitable to configure a device parameter.

The rule set may also include a command hierarchy. The command hierarchy may be a hierarchal structure, such as a tree or a set of indices, that corresponds to an ordered arrangement of commands dictated by the target network device's configuration format. The translation engine may determine the order for a set of commands based on the command hierarchy. For instance, the translation engine may construct a command tree based on the command hierarchy and may traverse the tree to determine the order of the commands suitable to configure the parameter at a target network device. The translation engine may arrange the commands in the determined order to produce a command block having a device-specific configuration format for the target network device. In this regard, the command block may include the command(s), arranged in the proper order, for setting a given parameter of a particular device. The command block may be a string of text or other code accepted at the device to configure a setting, for example. In some cases, the translation engine may traverse the tree in a depth-first fashion.

In some cases, different rule sets may be used for different network devices, as a given rule set may map to the device-specific configuration format for a particular device. In this regard, for translating a given configuration request, the translation engine may select a rule set to use based on information about a network device targeted by the configuration request, such as based on device identifying information associated with the targeted network device. The device identifying information may include a device type, stock keeping unit (SKU), firmware type, hardware version, software version, and/or the like associated with the target network device.

Moreover, in some cases, a single request for configuring a device parameter may target multiple target network devices. For instance, a request may be made to configure firewall access for both a gateway and an access point (AP) device. In these cases, the translation engine may use a first rule set to translate the request to a first command block for configuring a first target device (like the gateway) and may use a second rule set to translate the request to a second command block for configuring a second target device (like the AP device).

In addition to dictating a syntax and an arrangement of commands suitable to configure a single parameter, a device-specific configuration format may dictate an order for configuring multiple different parameters or functionalities on a device. In some cases, for example, a device-specific configuration format may dictate that a first parameter is to be configured prior to a second parameter. To illustrate, proper configuration of a device may involve setting the device's firewall access before creating a tunnel for the device. Configuring parameters out of order on a device may result in a failed configuration of one or more of those parameters.

Thus, in some examples, a configuration request may correspond to multiple device parameters. In these cases, the translation engine may determine that the request corresponds to configuring both first and second device parameters at a target network device. Translating the request from the first to second format may involve determining a set of command blocks and determining an ordering of the command blocks. For instance, a first command block may be determined to configure the first device parameter, a second command block may be determined to configure the second device parameter, and an order between the first and second command block may be determined. Continuing with the above example, for a configuration request corresponding to creating a tunnel and setting the firewall access for a target device, the translation engine may determine that a command block for the tunnel, a command block for the firewall, and an order between these command blocks for the target device. The translation engine may arrange the command blocks in the determined order. In some cases, the ordering may be determined based on a rule set.

Referring now to the drawings, FIG. 1 is a block diagram illustrating an example of a system 100 for providing unified configuration of heterogeneous devices in a network. The system 100 may include a network configuration system 102 in communication with a network 104, which may include network devices 106A to 106N (herein referred to collectively as network devices 106 or individually as network device 106). The network devices 106 may include heterogeneous devices, as the network devices 106 may include a variety of device types and/or device vendors. The network devices 106 may include, for example, a combination of an access point (AP) device, a switch, a gateway, a router, or the like. For instance, the network device 106A may be an access point device, the network device 106B may be a switch device, and the network device 106N may be a gateway device. As a result of their heterogeneity, various ones of the network devices 106 may support different configuration formats for configuring a parameter. Accordingly, configuration of a parameter at the network devices 106 may involve a number of different device-specific configuration formats.

The network configuration system 102 may include a translation system 108, a communication interface 110, and a network management system 111, and may be used to configure the network devices 106 based on a configuration request 112. The configuration request 112 may be a request, in a unified configuration format, to configure a parameter of a network device 106. The network management system 111 may receive the configuration request 112 via, for example, an input interface 113. The network management system 111 may communicate the configuration request 112 to the translation system 108. The translation system 108 may translate the configuration request 112 from the unified configuration format into command block output(s) 115, which may include one or more command blocks, in various device-specific configuration formats accepted by network devices 106. In particular, based on determining the configuration request 112 targets the network devices 106A-N, the translation system 108 may translate the configuration request 112 into command block output 115A for network device 106A, into command block output 115B for network device 106B, and into command block output 115N for network device 106N, where each of command blocks 115A-N are in a device-specific format for its target network device 106. The communication interface 110 may communicably couple the network configuration system 102 to network devices 106 and may provide the command block output(s) 115 to the network devices 106. In this way, a single configuration format, namely the unified configuration format, may be used to configure a parameter at heterogenous network devices 106 that accept various device-specific configuration formats.

The networking configuration system 102 (or components thereof) may comprise, be, or be part of, an information processing device, such as a computer (e.g., server), network device, or other device capable of processing information. For instance, the network configuration system 102 may be a computing device that includes a processing resource that executes instructions stored in a machine-readable medium, as described in greater detail with respect to FIG. 9. In some examples, the networking configuration system 102 may be provided in a device which is part of the network 104 which the networking configuration system 102 is used to configure. In other examples, the networking configuration system 102 may be provided in a device which is physically and logically outside of the network 104, with the system networking configuration system 102 being communicably connected to the network 104 via the internet and/or other intermediate communication channels. For example, the networking configuration system 102 may be provided in: one of the network devices of the network (e.g., one of the network devices 106 of network 104); in a network controller, server, or other computer connected to one of the network devices 106; in a private cloud computing platform (e.g., one owned by the same entity which owns the network); in a public cloud computing platform (e.g., one owned by a different entity than the owner of the network); or in some other information processing device.

The components and/or functionalities of the network configuration system 102 described herein, such as the translation system 108, the communication interface 110, the network management system 111, and the translation engine 114, may be implemented as software (including executable computer program instructions stored on a computer-readable storage medium), hardware, or a combination of software and hardware. For instance, it may be appreciated that the translation system 108, the communication interface 110, the network management system 111, and the translation engine 114 may be implemented by a computing device having at least one processing resource and at least one machine-readable storage medium storing instructions executable by the at least one processing resource to perform the functionalities described herein, as described below with reference to FIG. 9. Additionally, the components and/or functionalities of the network configuration system 102 may be spread among multiple devices, such as multiple computing devices, which may be communicatively coupled. For instance, the translation system 108 may be implemented via a first device, the network management system 111 may be implemented via a second device, and the communication interface 110 may be implemented via a third device. Moreover, it is noted that functionality attributed to a particular component of the network configuration system 102 may be implemented using another component of the network configuration system 102.

The translation system 108 may include a translation engine 114 and a number of rule sets 116A to 116N (herein referred to collectively as rule sets 116 or individually as rule set 116) that each include a respective command mapping 118 and a respective command hierarchy 120. The translation engine 114 may use a rule set 116 to translate the configuration request 112 from a unified configuration format to a device-specific format. In particular, the translation engine 114 may use the command mapping 118 of a rule set 116 to determine one or more commands, such as a CLI command, usable to change a setting of a parameter at a target network device 106. The translation engine 114 may further use the command hierarchy 120 of the rule set 116 to determine an order for the set of commands, and the translation engine 114 may arrange the set of commands in the determined order to produce a command block having the command(s) in an order suitable to configure the parameter at the target network device 106. In some cases, the translation engine 114 may further use the command hierarchy 120 of the rule set 116 to determine an order for a set of one or more command blocks to produce a command block output 115 suitable to configure one or more parameters at the target network device 106. As described in greater detail below, in some examples, the rule sets 116 may be generated based on a common configuration model 117.

The communication interface 110 may comprise a wireless or a wired communication interface. For instance, the communication interface 110 may enable communication between the network configuration system 102 and the network devices 106 over Wi-Fi, Bluetooth, or a network connection. A network connection may include, for example, connection to a public data network such as the Internet, a private intranet, a local area network (LAN), a wide area networks (WAN), a metropolitan area networks (MAN), combinations thereof, or the like. For instance, in certain examples, components of the system 100, such as the network configuration 102 or a portion thereof, may be hosted in a public or private cloud. In such cases, the communication interface 110 may enable communication from the cloud to devices 106 over a network connection.

Additionally or alternatively, the communication interface may include one or more communication ports (e.g., ethernet RJ45 ports, optical fiber transceiver ports, etc.) which can be connected via cables to a network device 106. In some cases, the network configuration system 102 may use the communication interface 110 to receive a configuration request 112. In some cases, the network configuration system 102 may use the communication interface 110 to provide command block output(s) 115 to various network devices 106.

The network management system 111 may provide an input interface 113. The input interface 113 may be based on a common configuration model 117 and may receive a configuration request 112. In some examples, the input interface 113 may be a user interface, which may be utilized to receive input (e.g., a user input) at the network management system 111 and to present information from the network management system 111. In this regard, input interface 113 may include or may be communicatively coupled to an input device, such as a keyboard, a sensor, a touch interface, a mouse, a microphone. Further, input interface 113 may include or may be communicatively coupled to an output device, such as a display, speaker, light, or the like. For instance, in some examples, input interface 113 may include a graphical user interface (GUI) with one or more editable fields. The GUI may be displayed at a display device and may be edited via inputs received at an input device, and such a display device and/or input device may be included in the input interface 113 or communicatively coupled thereto. In this regard, the configuration request 112 may be received at the input interface 113 via the GUI. The input interface 113 may additionally or alternatively include an application programming interface (API). Accordingly, a configuration request 112 may be received via an API call to the input interface 113.

The common configuration model 117 may include network configuration data and translation metadata. The network configuration data may represent network devices 106 and their configuration. In this regard, the network configuration data may be a model that describes network configuration elements, such as devices, device parameters, subparameters, and so forth, in a hierarchical structure (e.g., a tree structure). The network configuration data may be represented in a modeling language, such as YANG, TOSCA, Chef, Puppet, or the like. In some examples, the unified configuration format may be defined by the network configuration data of the common configuration model 117. Accordingly, the network management system 111 may use the common configuration model 117 to provide, via input interface 113, an interface for network configuration in the unified configuration format (e.g., a common data model format). For instance, the network management system 111 may provide an interface for device configuration that maps to the model of network configuration elements provided in the network configuration data. Accordingly, the configuration request 112 may be generated and/or received via the input interface 113.

The translation metadata of the common configuration model 117 may map the unified configuration format (e.g., a common data model) to a device-specific format. In some cases, for example, the common configuration model 117 may associate the translation metadata with the network configuration data. The common configuration model 117 may include respective translation metadata for each network configuration element included in the network configuration data. Moreover, the common configuration model 117 may associate one or more sets of translation metadata with an element, as each metadata may be device-specific. As an illustrative example, the network configuration data may include a device parameter as an element. For this element, the common configuration model 117 may include first translation metadata for a first network device (e.g., a switch), as well as second translation metadata for a second network device (e.g., a gateway). The first translation metadata may map the unified configuration format to a format specific to the first network device, while the second translation metadata may map the unified configuration format to a format specific to the second network device. An example of a common configuration model is illustrated in FIG. 8.

In some examples, the rule sets 116 may be generated based on the common configuration model 117. For instance, the network configuration system 102 or a computing device, such as the device described in FIG. 9, may extract the translation metadata associated with the configuration elements of the network configuration data to generate the rule sets 116. In particular, the network configuration system 102 may parse the hierarchy of the network configuration data and extract the translation metadata associated with each configuration element. With the extracted translation metadata, the network configuration system 102 may generate a separate rule set 116 for each device type. To that end, because the particular instances of translation metadata may be device-specific, the network configuration system 102 may separate the extracted translation metadata by device type to generate the separate rule sets 116. In some examples, a rule set 116 may be structured in a hierarchical structure (e.g., a tree structure) based on the hierarchy defined by the common configuration model 117. The rule sets 116 can be used by translation system 108 for translation from the unified configuration format to device-specific format(s).

As described herein, a configuration request 112 may be a request to configure one or more parameters of a network device 106. In this regard, a configuration request 112 may include one or more parameter configuration requests 122 (herein referred to collectively as parameter configuration requests 122 or individually as parameter configuration request 122) to set parameter(s) of a network device 106. Examples of parameters include tunnels, firewalls, virtual local area networks (VLANS), interfaces, wide local area networks (WLANs), service set identifiers (SSIDs), routing information, security policies, network bandwidth, Quality of Service (QoS), or any other features or functionalities which can configured at network devices 106.

A given parameter may include a hierarchy of configuration elements (e.g., sub-parameters, sub-parameters of sub-parameters, and so forth). In this regard, the configuration request 112 may be in the unified configuration format and may be received based on the common configuration model 117. Accordingly, the configuration request 112 may be formatted according to the hierarchical structure defined by the common configuration model 117. As a result, a parameter configuration request 122 may include one or more nested requests (e.g., sub-requests), such as sub-parameter configuration requests 124 (herein referred to collectively as sub-parameter configuration requests 124 or individually as sub-parameter configuration request 124), configuration requests to set a sub-parameter of a sub-parameter, and the like. Each nested request may be to set various configuration elements to different settings (values). For instance, a sub-parameter configuration request 124 may be a request to set a sub-parameter to a different setting. For ease of illustration, configuration request 112 is shown with parameter requests 122 and sub-parameter requests 124. However, it may be appreciated that a configuration request 112 may include any hierarchy (e.g., any level of nesting) of requests to set configuration elements.

In the illustrated example, the configuration request 112 includes two parameter configuration requests 122A-B-one for configuring parameter A (the first parameter configuration request 122A) and one for configuring parameter B (the second parameter configuration request 122B). Each of these parameter configuration requests 122 includes two sub-parameter configuration requests 124. In particular, the illustrated configuration request 112 includes a sub-parameter configuration request 124A to set the sub-parameter A1 to setting 1 and a sub-parameter configuration request 124B to set the sub-parameter A2 to the setting 2. Additionally, the illustrated configuration request includes a sub-parameter configuration request 124C to set the sub-parameter B1 to setting 3 and a sub-parameter configuration request 124D to set to set the sub-parameter B2 to the setting 4.

As an illustrative example, the configuration request 112 may be a request to set two different parameters, such as a tunnel parameter and a firewall, at one or more network devices 106. In such an example, the first parameter configuration request 122A may be a request for configuring a tunnel parameter, and the second parameter configuration request 122B may be a request for configuring firewall access. Continuing with this example, the sub-parameter configuration request 124A may be a request to set a source internet protocol address (IP) for the tunnel, and the sub-parameter configuration request 124B may be a request to set a destination IP address for the tunnel. The sub-parameter configuration request 124C may be a request to set a host internet protocol version 4 address (IPv4) for the firewall access, and the sub-parameter configuration request 124D may be a request to set a network IPv4 address for the firewall access.

As described herein, the translation engine 114 may use a rule set 116 to translate a configuration request 112 in a unified configuration format to a command block output 115 in a device-specific format. For instance, in the example illustrated, the network configuration system 102 may output the command block output 115N to the network device 106N based on the configuration request 112 and a rule set 116. As further illustrated in the exploded view, a command block output 115 produced by the translation engine 114, such as the command block output 115N, may include an ordered set of command blocks 126A-B (herein referred to collectively as command blocks 126 or individually as command block 126), and each of the ordered set of command blocks 126 includes a set of commands 128A-D (herein referred to collectively as commands 128 or individually as command 128) in a particular order.

In some cases, the translation system 108 may include different rule sets 116 for translating to different device-specific configuration formats. In some cases, for example, the translation system 108 may include different rule sets 116 for different network devices 106. For instance, a first rule set 116A may include a command mapping 118 and a command hierarchy 120 specific to a first network device 106A (e.g., an access point), while a second rule set 116B may include a mapping 118 and a command hierarchy 120 specific to a second network device 106B (e.g., a switch).

The translation engine 114 may determine the rule set 116 suitable to translate a configuration request 112 based on the configuration request 112 itself. In some cases, for example, the configuration request 112 may include device identifying information 130 that identifies a network device 106 targeted by the configuration request 112. The device identifying information 130 may include a device type, stock keeping unit (SKU), firmware type, hardware version, software version, and/or the like associated with the target network device 106. Using the device identifying information 130, the translation engine 114 may select the rule set 116 corresponding to a targeted network device 106.

As illustrated, in some examples, device identifying information 130 may be included in and/or associated with a parameter configuration request 122. For instance, each of the first parameter configuration request 122A and the second parameter configuration request 122B are shown as including device identifying information 130. The device identifying information 130 included in different parameter configuration requests 122 within the same configuration request 112 may be the same or different. For instance, the device identifying information 130 of each of the first parameter configuration request 122A and the second parameter configuration request 122B may target the same network device(s) 106. Alternatively, the device identifying information 130 of the first parameter configuration request 122A may target a first set of network device(s) 106, while the second parameter configuration request 122B may target a different, second set of network device(s) 106.

In other examples, the configuration request 112 may include one or more configuration objects, where each configuration object includes device identifying information 130 and a set of one or more parameter configuration requests 122 that correspond to the devices targeted by the device identifying information 130. For instance, in cases where the first parameter configuration request 122A and the second parameter configuration request 122B are requests to configure parameters at the same set of target network device(s) 106, the first parameter configuration request 122A and the second parameter configuration request 122B may be included in a configuration object with the device identifying information. In contrast, in cases where the first parameter configuration request 122A and the second parameter configuration request 122B are requests to configure parameter(s) at different target network device(s) 106, the first parameter configuration request 122A may be included in a first configuration object with first device identifying information 130, and the second parameter configuration request 122B may be included in a second configuration object with different, second device identifying information 130.

Based on device identifying information 130, the translation engine 114 may select a respective rule set for each parameter configuration request 122, each configuration object, or the like. For instance, in the illustrated example, the translation engine 114 may identify a first rule set 116 based on the device identifying information 130 included in the first parameter configuration request 122A, and the translation engine 114 may identify a second rule set 116 based on the device identifying information 130 included in the second parameter configuration request 122B. The first rule set 116 and the second rule set 116 may be the same or different based on the device identifying information 130 of each parameter configuration request 122A-B. To illustrate, responsive to determining that the device identifying information 130 of the first parameter configuration request 122A targets network device 106A, the translation engine 114 may, using a first rule set 116A, produce command block output 115A for the first network device 106A. Similarly, responsive to determining that the device identifying information 130 of the second parameter configuration request 122B targets network device 106B, the translation engine 114 may, using a second rule set 116B, produce command block output 115B for the second network device 106B.

Additionally or alternatively, device identifying information 130 may identify multiple network devices 106 to be targeted. In such cases, the translation engine 114 may select a respective rule set 116 for each network device 106 targeted. For instance, responsive to determining the configuration request 112 targets network devices 106A-N, the translation engine 114 may: using the first rule set 116A, produce command block output 115A for the first network device 106A; using the second rule set 116B, produce command block output 115B for the second network device 106B; and using the third rule set 116N, produce command block output 115N for the third network device 106N. In other cases, the translation engine 114 may produce a common command block output 115 for each device identified in the device identifying information 130. For instance, responsive to determining the configuration request 112 targets network devices 106A and 106B, the translation engine 114 may: using the first rule set 116A, produce a first command block 126; and using the second rule set 116B, produce a second command block 126. The translation engine 114 may output command block output 115A to the first network device 106A and may output command block output 115B to the second network device 106B, and command block output 115A and command block output 115B may each include the first command block 126 and the second command block 126. In some cases, for example, the first network device 106A may be configured based on the first command block 126 take no action based on the second command block 126, and the second network device 106B may be configured based on the second command block 126 take no action based on the first command block 126.

In some cases, the translation engine 114 may use a command mapping 118 of a rule set 116 to determine one or more commands 128 usable to change a setting of a parameter at a target network device 106. A command mapping 118 may map the parameter configuration request 122 to one or more commands 128 that are in a device-specific configuration format and will thus be accepted at the target network device 106. In this regard, the command mapping 118 may ensure the commands 128 have a syntax, are in a suitable language, and the like to be accepted at the target network device 106. A command may be a CLI command, a representational state transfer (REST) command, a Python script, or a string of text, for example. As an illustrative example, the command mapping 118 may map a parameter configuration request 122 to a particular set of CLI commands suitable to configure the parameter at the target network device 106. Because a command mapping 118 may be specific to a device, different command mappings 118 may map the same configuration request 112 to different sets of commands in various device-specific formats. Moreover, in some cases, a first command mapping 118 may map a configuration request 112 to a set of commands usable to change a setting of a parameter to a first setting (e.g., value), while a second command mapping 118 may map the configuration request 112 to a set of commands usable to change a setting of a parameter to a different, second setting.

As described, a parameter may include a hierarchy of configuration elements, and a parameter request 122 may correspondingly include a hierarchy of nested requests (e.g., sub-requests), such as sub-parameter configuration requests 124. Accordingly, to map a parameter configuration request 122 to one or more commands, the command mapping 118 may map each of the hierarchy of nested requests to one or more commands. For instance, the command mapping 118 may map each sub-parameter configuration request 124 of a parameter configuration request 122 to a command 128 suitable to set the corresponding sub-parameter. In some examples, the translation engine 114 may traverse the hierarchy of requests in a configuration request 112 and may traverse a corresponding hierarchy of a command mapping 118 to determine one or more commands suitable to set a parameter. In some examples, the command hierarchy 120 may define the hierarchy of the command mapping 118.

Based on the illustrated parameter configuration request 122A, for example, the translation engine 114 may use the command mapping 118 to determine one or more commands 128 to set the parameter A. In some cases, the translation engine 114 may use the command mapping 118 of the rule set 116N to determine, based on the sub-parameter configuration request 124A, a command 128A to set the sub-parameter A1 to setting 1 at the network device 106N. Similarly, the translation engine 114 may use the command mapping 118 to determine, based on the sub-parameter configuration request 124B, a command 128B to set the sub-parameter A2 to setting 2 at the network device 106N. To determine the commands 128 to set parameter B at the network device 106N, the translation engine 114 may use the command mapping 118 to determine: (1) a command 128C to set the sub-parameter B1 to setting 3 (based on the sub-parameter configuration request 124C); and (2) a command 128D to set the sub-parameter B2 to setting 4 (based on the sub-parameter configuration request 124D).

The translation engine 114 may further use the command hierarchy 120 of the rule set 116 to determine an order for the set of commands 128 identified with the command mapping 118. In some cases, for example, a device-specific configuration format may dictate that a first sub-parameter is to be configured at a network device 106 prior to a second sub-parameter. Accordingly, the command hierarchy 120 may provide an order for the set of commands 128 to ensure the sub-parameters are set in this order. The translation engine 114 may arrange the set of commands 128 in the order determined based on the command hierarchy 120 to produce a command block 126. The resulting command block 126 may be in the device-specific configuration format and may be suitable to cause a parameter of a network device 106 to be set according to the configuration request 112 (e.g., by setting the sub-parameters of the parameter in the order). In some examples, the command hierarchy 120 may be based on the common configuration model 117. For instance, the command hierarchy 120 may be defined in translation metadata of the common configuration model 117. Because the command hierarchy 120 is device-specific, the command hierarchy 120 may differ from the hierarchy of the unified configuration format. In this regard, the command hierarchy 120 may differ from the hierarchy of the network configuration data of the common configuration model 117 and from the corresponding hierarchy of requests in the configuration request 112.

In the illustrated example, using a command hierarchy 120 of the rule set 116N, the translation engine 114 arranged the command 128C and command 128D in the command block 126B such that the command 128C precedes the command 128D. As such, the command block 126B may cause the network device 106N to set the sub-parameter B1 (to setting 3) prior to setting the sub-parameter B2 (to setting 4). The translation engine 114 may further arrange command 128A and command 128B in the command block 126A such that the command 128B precedes the command 128A. As such, the command block 126A may cause the network device 106N to set the sub-parameter A2 (to setting 2) prior to setting the sub-parameter A1 (to setting 1). As further shown, a command block 126 produced by the translation engine 114 may include commands 128 in the same order as the translated sub-parameter configuration requests 124 (as is the case with respect to commands 128C and 128D of command block 126B) or in a different order from the translated sub-parameter configuration requests (as is the case with respect to commands 128A and 128B of command block 126A).

In some cases, the command hierarchy 120 may dictate an order between command blocks 126. In some cases, for example, a device-specific configuration format may dictate that a first parameter is to be configured at a network device 106 prior to a second parameter. The command hierarchy 120 may thus provide an order for the command blocks 126 to ensure the parameters are set in this order. The translation engine 114 may arrange the set of command blocks 126 in the order determined based on the command hierarchy 120 to produce the command block output 115. The resulting command block output 115 may be in the device-specific configuration format and may be suitable to cause multiple parameters of a network device 106 to be set according to the configuration request 112.

In the illustrated example, using the command hierarchy 120 of the rule set 116N, the translation engine 114 arranged command block 126A and command block 126B such that the command block 126B precedes the command block 126A. As such, the command block output 115N may cause the network device 106N to set the parameter B (e.g., by setting sub-parameters B1 and B2) prior to setting the parameter A (e.g., by setting sub-parameters B1 and B2). As shown, a command block output 115 produced by the translation engine 114 may include commands blocks 126 in a different order from the parameter configuration requests 122 from which they are translated (as is the case with command block 126A and 126B being in an opposite order from parameter configuration request 122A and 122B). In other cases, command blocks 126 may be produced in the same order as the parameter configuration requests 122 from which they are translated.

As described herein, the translation system 108 may include different rule sets 116 for different network devices 106. Accordingly, while the translation of the configuration request 112 to a device-specific configuration format for network device 106N is illustrated and described as resulting in command block output 115N, it may be appreciated that different command block outputs 115 may be produced for other network devices 106, such as network devices 106A-B. In particular, the command block outputs 115 for other network devices 106 may, based on a respective rule set 116, include any combination of different command(s), different command block(s), a different order between commands, and a different order between command blocks. In this regard, each command block output 115 may be formatted according to a respective device-specific configuration format so that the command block output 115 is suitable to cause a parameter to be set at a respective target network device 106.

Figure 2:
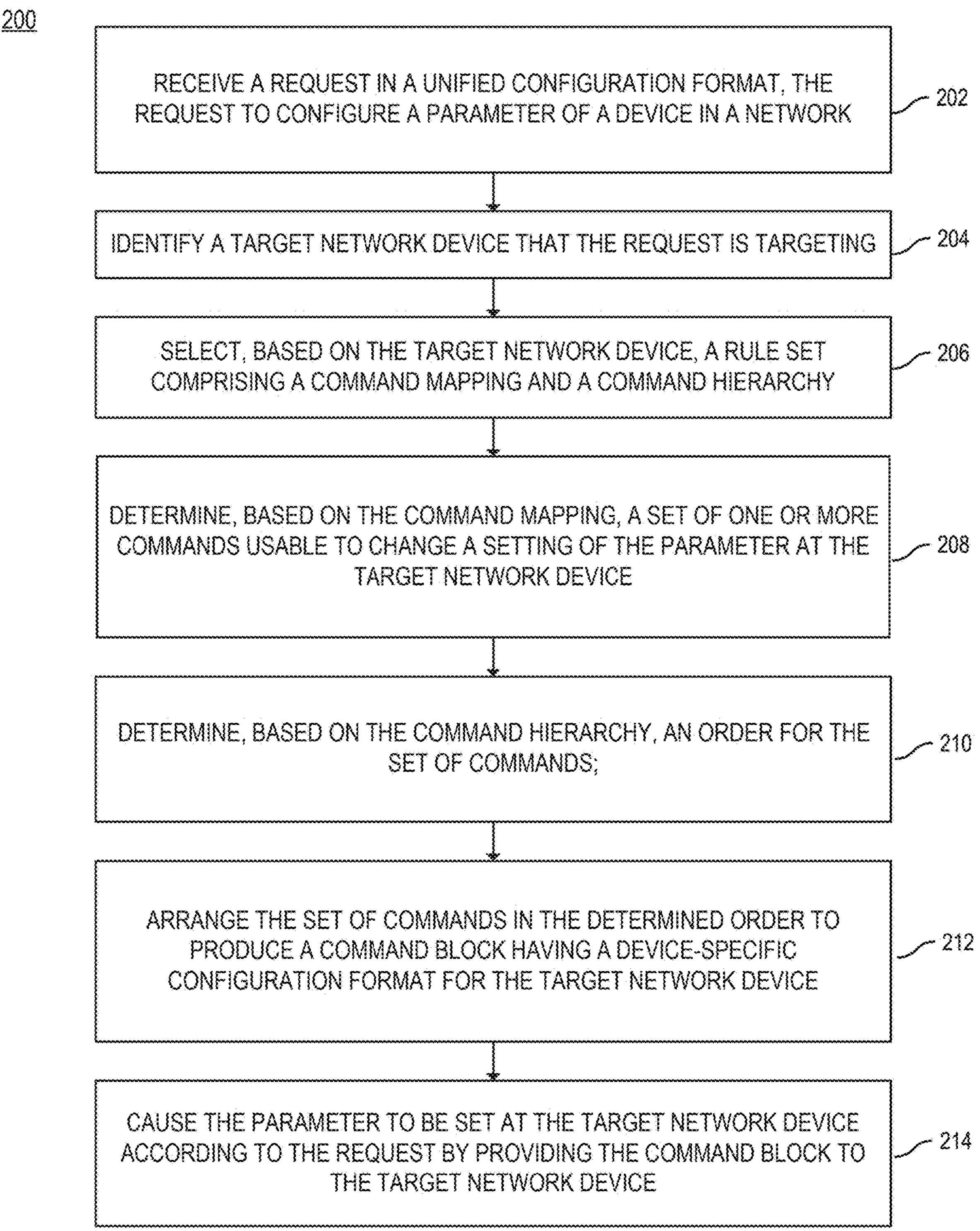
FIG. 2 is a flow diagram depicting a method for providing unified configuration of heterogeneous devices in a network, according to an example.

Turning now to FIG. 2, a flow diagram depicting a method 200 for providing unified configuration of heterogeneous devices in a network is shown, in accordance with an example. As described herein, the method 200 involves translating a configuration request to a set of commands suitable to configure a parameter at a network device. For illustration purposes, the method 200 will be described in conjunction with the system 100 of FIG. 1. The method 200 may include method blocks 202, 204, 206, 208, 210, 212, and 214 (hereinafter collectively referred to as blocks 202-214) which may be performed by a processor-based system such as, for example, the network configuration system 102 or a component thereof, such as translation system 108. In particular, operations at each of the method blocks 202-214 may be performed by a computing device that includes a processing resource by executing the instructions stored in a machine-readable medium, as described below with reference to FIG. 9. Moreover, it is to be noted that in some examples, the order of execution of the blocks 202-214 may be different than that shown in FIG. 2. For example, blocks may be added or omitted, and the blocks 202-214 may be performed in series, in parallel, or a series-parallel combination.

At block 202, the network configuration system 102 may receive a request in a unified configuration format. The request may be a request to configure a parameter of a device in a network. As described with reference to FIG. 1, a configuration request 112 may be an example of this request, and network devices 106, such as a switch, gateway, access point, and the like, may be examples of devices in the network.

At block 204, the network configuration device 102 (using the translation engine 114) may identify a target network device (e.g., a particular network device 106) that the request is targeting. In some cases, the request may include device identifying information, such as the device identifying information 130 described herein. The device identifying information 130 may include, for example, a device type, stock keeping unit (SKU), firmware type, hardware version, software version, and/or the like associated with the target network device. The network configuration system 102 may identify the target network device 106 based on the device identifying information 130 included in the request. As described herein, the device identifying information 130 may be included in and/or associated with a particular parameter configuration request or a set of parameter configuration requests.

At block 206, the network configuration device 102 (using the translation engine 114) may select, based on the target network device 106, a rule set, such as rule set 116 (FIG. 1), comprising a command mapping 118 and a command hierarchy 120. In some cases, for example, the network configuration device 102 may include different rule sets for different network devices 106, as illustrated by rule sets 116A-N (FIG. 1). The network configuration device 102 may therefore identify an appropriate rule set 116 from among these rule sets 116 based on the target network device 106. In particular, in some cases, the network configuration device 102 may use the device identifying information 130 to select a rule set 116 corresponding to a targeted network device 106. A rule set 116 corresponding to a target network device 106 may include a command mapping 118 and a command hierarchy 120 capable of producing a set of commands in a configuration format specific to the target network device 106 such that the set of commands is suitable to change a setting of a parameter at the device.

At blocks 208-212, the network configuration device 102 (using the translation engine 114) may, using the rule set, translate the request from the unified configuration format to a device-specific configuration format for the target network device. In particular, at block 208, the network configuration device 102 may determine, based on the command mapping 118, a set of one or more commands usable to change a setting of the parameter at the target network device 106. At block 210, the network configuration device 102 may determine, based on the command hierarchy 120, an order for the set of commands. At block 212, the network configuration device 102 may arrange the set of commands in the determined order to produce a command block 126 having a device-specific configuration format for the target network device 106. In some examples, the network configuration device 102 (using the translation engine 114) may perform the operations of blocks 208-212 (e.g., translate the request) in accordance with the graphical representation illustrated in FIG. 3 and its corresponding description.

Figure 3:
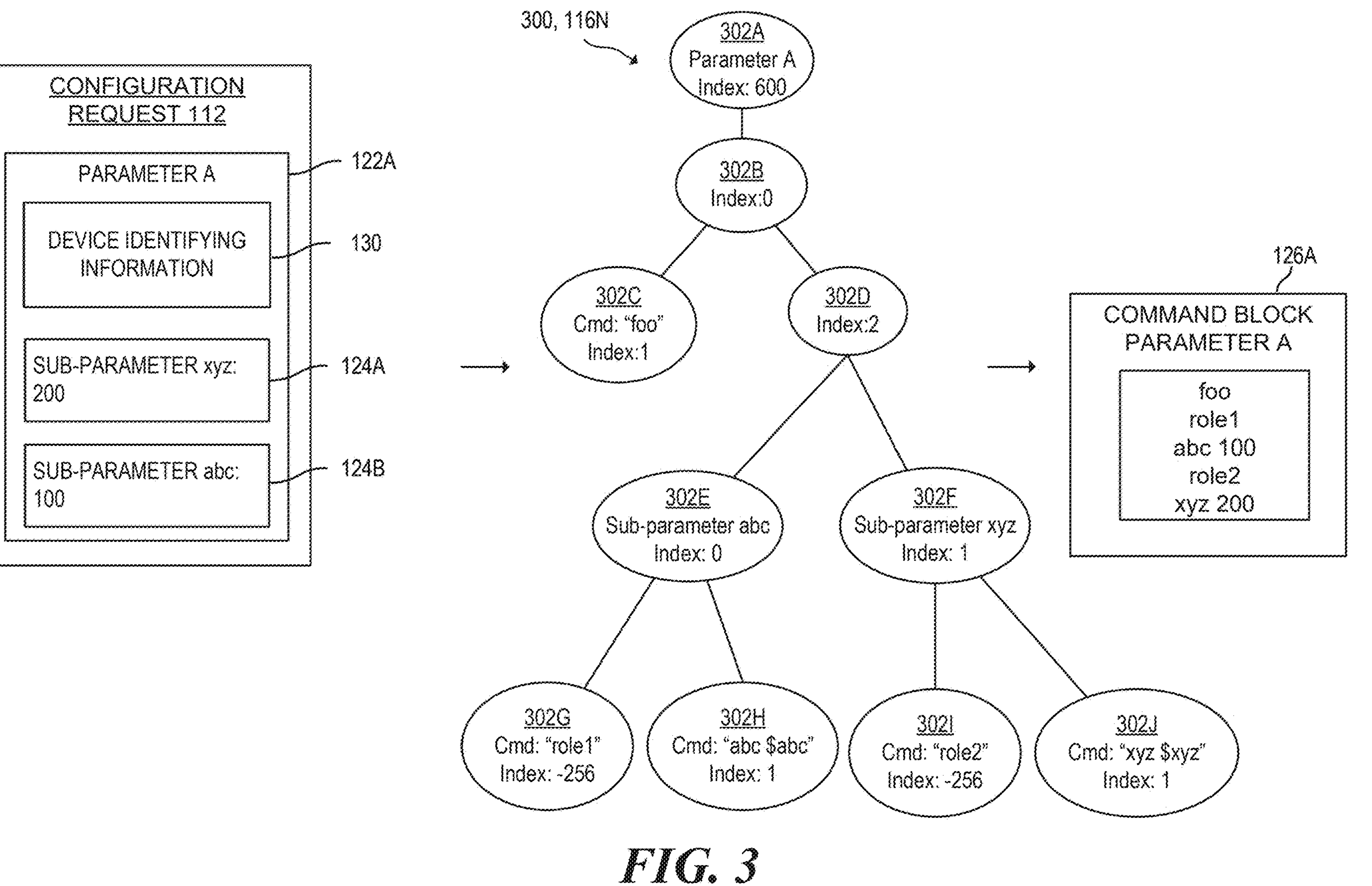
FIG. 3 is a graphical representation depicting the translation, based on a rule set, of a configuration request to a set of commands suitable to configure a parameter at a network device, according to an example.

Turning to FIG. 3, a graphical representation depicting the translation, based on a rule set 116N, of a configuration request to a set of commands suitable to configure a parameter at a network device 106 is shown, in accordance with an example of blocks 208-212 (FIG. 2). The configuration request 112 of FIG. 3 is the same as the configuration request of FIG. 1, although the example of FIG. 3 illustrates sub-parameter A1 as having the name "xyz" and being set to "200" for setting 1 and illustrates sub-parameter A2 as having the name "abc" and being set to "100" for setting 2. Similarly, the rule set 116N of FIG. 3 is the same as a rule set 116N of FIG. 1, although the example of FIG. 3 illustrates different details. Further, the command block 126A of FIG. 3 is the same as the command block 126A of FIG. 1, although the example of FIG. 3 provides an example of command text for commands 128C-D. For ease of illustration, the example configuration request 112 of FIG. 3 omits the parameter configuration request 122B for setting parameter B that is illustrated in FIG. 1, and the remainder of the command block output 115N corresponding to that request is also not shown in FIG. 3.

In the illustrated example, a configuration request 112 to configure a parameter (by at least setting sub-parameter abc to the value 100 and setting sub-parameter xyz to the value 200) is translated to the command block 126A using the rule set 116N, which is shown as having a tree structure 300 with nodes 302A-J (herein referred to collectively as nodes 302 or individually as node 302). As described herein, the rule set 116N may include a command mapping 118 and a command hierarchy 120. As described in greater detail below, the command mapping 118 may include syntax for constructing commands suitable to configure a parameter at a network device, and the command hierarchy 120 may organize elements of the rule set 116, such as the syntax provided by the command mapping 118 into a hierarchy (e.g., order). Accordingly, the command hierarchy 120 may be used to determine an order for the commands generated based on the command mapping 118.

To determine, based on the command mapping 118, a set of one or more commands usable to change a setting of the parameter the target network device (block 208 of FIG. 2), the network configuration system 102 may identify commands associated with the parameter. In some cases, for example, the command mapping 118 of rule set 116N may map a configuration request 112 to a set of device-specific commands (or portions thereof). The command mapping 118 may associate the configuration request 112 with the appropriate commands based on, for example, a parameter identifier, such as a parameter name, a parameter index or the like. For instance, a parameter configuration request 122 may include a unique name or identifier associated with the parameter the request aims to configure, and the command mapping 118 may include a corresponding name or identifier to associate the configuration request 112 with specific commands. In cases where the command mapping 118 lacks an association with a configuration request 112 or a portion thereof (e.g., a parameter configuration request 122), the network configuration system 102 may determine that the command mapping 118 lacks a command useable to set the parameter, and the network configuration system 102 may refrain from producing commands to set that parameter.

As described, a parameter configuration request 122 may include a hierarchy of nested requests (e.g., sub-requests), such as sub-parameter configuration requests 124, requests to configure sub-parameters of a sub-parameter, and so forth, and the command mapping 118 may map each of the hierarchy of nested requests to one or more commands. Accordingly, to determine the set of commands (block 208 of FIG. 2), the network configuration system 102 may traverse the hierarchy of requests in a parameter configuration request 122. For each request, the network configuration system 102 may determine whether a command mapping 118 maps the request to a command (or a portion thereof). In cases where the command mapping 118 maps the request to a command, the network configuration system 102 may determine the command associated with the request.

In the illustrated example, node 302A is labeled "Parameter A" to demonstrate the association (e.g., mapping) between commands (illustrated with the label "Cmd") in the tree structure 300 and the parameter configuration request 122 to set parameter A. A command mapping 118 may further associate nested requests of a parameter configuration request 124 to commands. As an illustrative example, the command mapping 118 may map a sub-parameter configuration request 124 with a particular command based on a sub-parameter identifier. Such an association is illustrated between the sub-parameter configuration request 124A to configure sub-parameter abc and command included in the node 302E by the label "Sub-parameter abc" at this node. It may be appreciated that command mapping 118 may further associate requests to configure a sub-parameter of a sub-parameter or requests deeper (e.g., further nested) in a hierarchy of parameter configuration request 124 with commands. In this regard, a command mapping 118 may include a mapping to a command for any level of request to configure a configuration element.

While the command mapping 118 is illustrated as associating a complete command (e.g., an entire command line) with a parameter configuration request 122 or a nested request of parameter configuration request 122 (e.g., a sub-parameter configuration request 124), it may be appreciated that in some cases, the command mapping 118 may associate a parameter configuration request 122 or a nested request of parameter configuration request 122 with one or more portions of commands (e.g., partial command lines), which may be combined (e.g., ordered) into a complete command. As described in further detail below with respect to the command hierarchy 120, in some cases, commands for configuring a setting of a parameter may be included in a set of nodes 302 associated with the parameter, such as a parent node and/or one or more of its children nodes.

In some cases, the command mapping 118 may include a command that is suitable to be sent in its unmodified form in a node 302. For instance, the illustrated command "role1" in the node 302G may be added to the command block 126A and sent to a target network device 106 as-is. In other cases, the command mapping 118 may include a command that includes a placeholder. For instance, the illustrated command "abc $abc" in the node 302H includes the placeholder "$abc," In such cases, a value for the placeholder may be determined before the command is suitable to be sent to a target network device, such as network device 106N. In some cases, determining the value for the placeholder may involve parsing the value from the configuration request and assigning it to the placeholder. Continuing with the "$abc" placeholder example, "$abc" is illustrated as being replaced with the value "100" in the command block 126A so that the full command reads "abc 100." In some cases, the placeholder may be structured as a key-value pair, such as a JavaScript Object Notation (JSON) key-value pair. In this regard, parsing the value of the placeholder from the configuration request may involve identifying a key in the configuration request and assigning the value of this key to the placeholder.

Thus, as described herein, determining a set of commands useable to change a setting of a parameter of a target network device (block 208 of FIG. 2) may involve identifying the set of commands, such as identifying the commands based on an identifier associated with a configuration request and the commands. Determining the set of commands may further involve assigning a respective value to any placeholders in the set of commands. Assigning these values may involve parsing the configuration request to determine the values and assigning the values to their corresponding placeholders.

To determine an order for the set of commands (block 210 of FIG. 2), the network configuration system 102 may use the command hierarchy 120. In some cases, the command hierarchy 120 may include a combination of a set of indices, a tree structure, an ordered list, or the like. In some examples, the command hierarchy 120 may be based on the common configuration model 117. For instance, the command hierarchy 120 may be defined in translation metadata of the common configuration model 117 such that the command hierarchy 120 is device-specific.

As illustrated, the command hierarchy 120 of the rule set 116N may organize elements of a rule set, such as commands dictated by a command mapping 118, into a tree structure 300 that includes a set of nodes 302 branching off each other such that parent nodes are higher in a hierarchy of the structure than their children. As further illustrated, in some examples, the tree structure 300 may be determined based on indices. In this regard, each node 302 may include an index value (illustrated with the label "Index"), and these index values may be used to determine a node's position in the tree structure 300.

As described herein, the term "child node" may refer to a node that branches from a parent node. As an illustrative example, node 302G is a child node of node 302E. It may further be appreciated that a parent node having children nodes branching off it may further be a child node itself. For instance, the illustrated node 302E is a parent node, as described herein, and the node 302E is a child node of node 302D.

In some cases, a node 302 may correspond to a configuration element of a network device 106. In this regard, a node 302 may correspond to a network device 106 at a device-level, at a parameter-level, at a sub-parameter-level, or the like. The command hierarchy 120 may arrange the elements of a rule set 116 such that a node 302 associated with a network device 106 at the device-level is a parent of nodes 302 associated with parameters configurable at the device, which, in turn, are parent nodes 302 associated with the sub-parameters used to set the respective parameter, and so forth. As an illustrative example, node 302A may correspond to a particular parameter (parameter A) to be set at the target network device 106N. Because the parameter includes a number of sub-parameters, the node 302A includes a number of children nodes 302B-J, which may include information (including commands) from a command mapping 118 to set the sub-parameters. In this regard, the commands (or portions thereof) to configure a parameter at a network device may be spread across different nodes 302 in the tree structure 300 dictated by the command hierarchy 120. While the tree structure 300 is illustrated with a particular structure, it may be appreciated that, for a given device-specific format, the command hierarchy 120 may include any number of levels of nodes 302 arranged in a hierarchy. For instance, in cases where a sub-parameter itself includes sub-parameters, the tree structure 300 may include additional layer(s) of nodes that are children to a sub-parameter parent node. In this regard, the command hierarchy 120 may support any level of nesting of parameters, sub-parameters, and the like.

Determining the order of these commands may involve constructing a command tree dictated by the command hierarchy 120. As described herein, a command tree may relate to an arrangement of commands in a tree structure, such as tree structure 300. In this regard, the illustrated tree structure 300 may be referred to interchangeably as a command tree. Further, in some cases, constructing a command tree may involve using both the command mapping 118 and command hierarchy 120. As such, it may be appreciated that while determining a set of commands to change a setting of a parameter at the target network device (block 208 of FIG. 2) and determining an order of the set of the commands (block 210 of FIG. 2) are illustrated as separate, these operations may be performed in parallel and/or may be combined.

In some cases, constructing a command tree (having tree structure 300) may involve identifying the nodes 302 associated with a parameter configuration request of a configuration request (e.g., associated with configuring a setting of the parameter). These nodes 302 and their arrangement may be determined based on the command mapping 118 and the command hierarchy 120 of the rule set 116N. In some cases, the translation engine 114 may initiate construction of the command tree with a parent node (e.g., 302A) and may then build out the command tree by adding children nodes (e.g., 302B-J) that branch in an appropriate hierarchy from the parent node. In some cases, for example, the translation engine 114 may traverse the hierarchy of requests (e.g., nested requests) in a parameter configuration request 122. In traversing the requests, the translation engine 114 may identify, based on the command mapping 118, a set of commands corresponding to a parameter configuration request 122 at the parameter-level. The translation engine 114 may organize these commands into nodes having hierarchal positions, such as an index, based on the command hierarchy 120.

The translation engine 114 may then iterate through the sub-parameter configuration requests 124 of the parameter configuration request 122. For each sub-parameter configuration request 124, the translation engine 114 may determine whether the command mapping 118 includes any commands. For requests with corresponding commands, the translation engine 114 may further determine a hierarchal position for nodes having the commands within the command tree (tree structure 300). For sub-parameter configuration requests 124 where the command mapping 118 lacks a command usable to set the sub-parameter (e.g., the command mapping 118 does not associate the request with a command), the translation engine 114 may refrain from adding commands to the command tree, which may result in the sub-parameter remaining unchanged (if it exists) at the target network device 106. Similarly, in cases where a command mapping 118 lacks commands associated with a parameter configuration request 122, the translation engine 118 may refrain from adding commands to the command tree, which may result in the parameter remaining unchanged (if it exists) at the target network device 106. For parameter requests 122 having additional nesting of requests, the translation engine may continue to iterate through these sub-requests to identify commands and their hierarchies according to the techniques described herein.

With the illustrated parameter configuration request 122A, the translation engine 114 may identify, based on the command mapping 118, the nodes 302A-D as corresponding to the parameter configuration request 122A. The translation engine 114 may order these nodes 302A-D based on the command hierarchy 120. As illustrated in node 302C, a command, like the illustrated "foo," may be associated with a parameter independent of a sub-parameter. In some cases, such a command association may comply with a device-specific configuration format by, for example, serving as an initialization command.

The translation engine 114 may additionally iterate through sub-parameter configuration request 124A and sub-parameter configuration request 124B. The translation engine may identify the nodes 302F-I based on the command mapping 118 associating these nodes with the sub-parameter configuration request 124A, and the translation may order the nodes 302F-I into the illustrated hierarchy based on the command hierarchy 120. In this regard, based on the command hierarchy 120, the nodes 302F-I may be added as children of a parent node corresponding to the parameter to be configured, such as parent node 302D. For the sub-parameter configuration request 124B, the translation engine may perform similar operations to identify and arrange nodes 302E-H as shown. With this process, the illustrated command tree (tree structure 300) may be constructed.

While the order of a set of commands is described as being determined based on construction of a command tree, it may be appreciated that an alternative hierarchical structure may be used. For instance, the commands may be arranged in an indexed list or other suitable hierarchical structure that includes an order. Moreover, it may be appreciated that the hierarchical structure used may be constructed according to a different hierarchy and/or order of operations. For instance, the children nodes 302 of a command tree may be identified prior to the parent nodes 302. Additionally or alternatively, a rule set 116 and/or a command hierarchy 120 may be constructed based on any hierarchy of sub-parameter, parameter, and device. For instance, while described as being specific to various devices, rule sets 116 may instead be specific to parameters. In such cases, the command mapping 118 and the command hierarchy 120 may organize commands to set a parameter by the device types capable of having the parameter set.

Arranging the set of commands in the determined order to produce a command block having a device-specific configuration format for the target network device (block 212 of FIG. 2) may involve traversing the constructed command tree (tree structure 300). In some cases, the translation engine may traverse the command tree in a depth-first fashion to read and arrange the set of commands. Traversing a tree depth-first may involve backtracking up through the tree from the deepest node in the tree. From the deepest node, sibling nodes (sharing a parent node with the deepest node) are read, if they exist. Subsequently, the deepest node's parent node and the parent node's siblings are visited, and so on.

Traversing the illustrated command tree (tree structure 300) in a depth first fashion may result in the command block 126A having the illustrated ordering of commands. The depth first traversal may involve determining the command "role1" at node 302G. Subsequently, command "abc 100" (having an assigned value to the placeholder) may be read from node 302H, placing this command after "role1" in an ordered set of commands. The commands may be arranged in the illustrated order in the command block by traversing node 302I (having command "role2") before node 302J (having command "xyz 200"). Further, according to depth-first traversal, the commands resulting from node 302D and its children 302E-J may be arranged after the command of node 302*c* ("foo").

Returning now to FIG. 2, at block 214, the network configuration system 102 may cause the parameter to be set at the target network device 106 according to the request by providing the command block 126 to the target network device 106. In some cases, the network configuration device 102 may provide the command block 126 to the target network device 106 by outputting the command block 126 directly to the network device 106. For instance, the network configuration device 102 may use the communication interface 110 to communicate (e.g., transmit) the command block 126 to the target network device 106. In some cases, the network configuration device 102 may use the device identifying information 130 to send the command block 126 to the appropriate network device 106.

In some cases, the network configuration system 102 may provide the command block 126 indirectly to the target network device 106. For instance, the network configuration system 102 or another device in the network 104 may process the command block 126 further prior to its delivery at the network device 106. To illustrate such further processing, in some cases, a command block 126 may include a set of CLI commands. The CLI commands may be converted into an equivalent REST payload. In other cases, the command block 126 may be created directly as a REST payload (e.g., by translating a configuration request into a set of REST commands).

Figure 4:
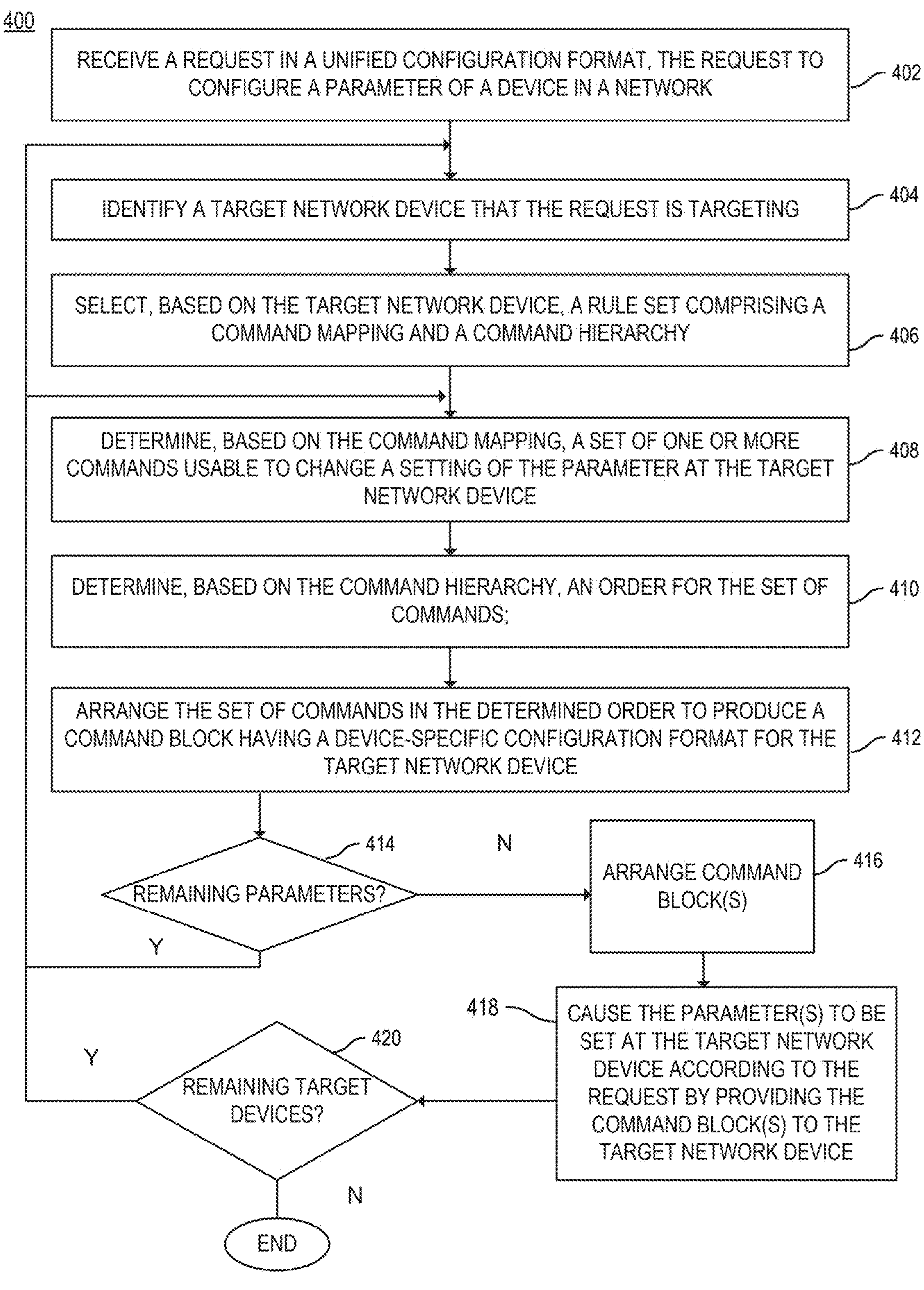
FIG. 4 is a flow diagram depicting a method for providing unified configuration in a single workflow of multiple parameters at multiple network devices in a network, according to an example.

Turning to FIG. 4, a flow diagram depicting a method 400 for providing unified configuration in a single workflow of multiple parameters at multiple network devices 106 in a network 104, is shown, in accordance with an example. As described herein, the method 400 involves translating, for each of a set of target network devices 106 and for each parameter to be configured, a configuration request 112 to a set of commands suitable to configure the respective parameter at the respective network device 106. A configuration request 112 may include multiple parameter configuration requests 122 (as illustrated in FIG. 1), for example, and the method 400 may be used to translate each of these requests 122 into a respective command block 126 useable to configure the parameter at a target network device 106. Moreover, the device identifying information 130 of a configuration request 112 may identify multiple target network devices 106, and the method 400 may be used to configure appropriate parameter(s) at each device 106 targeted by a configuration request 112.

For illustration purposes, the method 400 will be described in conjunction with the system 100 of FIG. 1. The method 400 may include method blocks 402, 404, 406, 408, 410, 412, 414, 416, 418, and 420 (hereinafter collectively referred to as blocks 402-420) which may be performed by a processor-based system such as, for example, the network configuration system 102. In particular, operations at each of the method blocks 402-420 may be performed by a data processing device by executing the instructions stored in a machine-readable medium, as described below with reference to FIG. 9. Moreover, it is to be noted that in some examples, the order of execution of the blocks 402-420 may be different than that shown in FIG. 4. For example, blocks may be added or omitted, and the blocks 402-420 may be performed in series, in parallel, or a series-parallel combination.

The method 400 may involve: receiving a request in a unified configuration format, the request to configure a parameter of a device in a network (at block 402); identifying a target network device that the request is targeting (at block 404); selecting, based on the target network device, a rule set comprising a command mapping and a command hierarchy (at block 406); determining, based on the command mapping, a set of one or more commands usable to change a setting of the parameter at the target network device (at block 408); determining, based on the command hierarchy, an order for the set of commands (at block 410); and arranging the set of commands in the determined order to produce a command block having a device-specific configuration format for the target network device (at block 412). Blocks 402-412 may be examples of the blocks 202-212 (FIG. 2) described herein. Accordingly, the operations associated with the blocks 402-412 may be performed as described herein with respect to blocks 202-212.

At block 414, the method 400 may involve determining whether the configuration request includes a request to configure any remaining parameters (e.g., any remaining parameter configuration requests). In some cases, for example, the network configuration system 102 (using the translation engine 114) may perform the operations of blocks 402-412 to produce a first command block for configuring a first parameter at a target network device. At block 414, the translation engine 114 may determine whether an additional parameter is to be configured at the target network device. The translation engine 114 may make this determination based on the configuration request by, for example, determining whether the configuration request includes an additional parameter configuration request, such as the parameter configuration requests 122A-B illustrated in FIG. 1.

Determining whether a parameter remains to be configured (at block 414) may also involve determining whether the command mapping 118 of a rule set 116 includes commands associated with a configuration request 112 (e.g., with a remaining parameter configuration request 122). In this regard, in cases where a configuration request 112 includes an additional parameter configuration request 122, the translation engine 114 may determine whether the command mapping 118 associates the request 122 with a set of commands. If the command mapping 118 lacks a command associated with the additional parameter configuration request 122 (e.g., a command usable to change a setting of the additional parameter at the target network device 106), the translation engine may refrain from setting the additional parameter at the target network device 106. In this regard, the translation engine may refrain from producing a command block 126 for this parameter configuration request 122. If, however, the command mapping 118 includes a command associated with the additional parameter configuration request 112 (e.g., a command usable to change a setting of the additional parameter at the target network device 106), the translation engine 114 may determine that a parameter remains to be configured.

In response to a parameter remaining to be configured at block 414, the translation engine 114 may produce an additional command block 126 to configure that parameter at the target network device 106. In this regard, the method may proceed to block 408, and the translation engine 114 may replicate the operations of blocks 408-412 for the remaining parameter. In the case of a configuration request 112 having two parameter configuration requests 122, as illustrated in FIG. 1, the translation engine may: produce, based on the first parameter configuration request 122A, a first command block 126A for configuring the first parameter (at blocks 402-412); determine the second parameter configuration 122B request remains (at block 414); and produce, based on the second parameter configuration request 122B, a second command block 162B for configuring the second parameter (at blocks 408-412).

In some cases, responsive to determining an additional parameter configuration request remains (at block 414), the translation engine 114 may identify the target network device that the additional parameter configuration request is targeting (at block 404). For instance, the translation engine 114 may identify the network device targeted in the device identifying information 130 of the additional parameter configuration request. The translation engine 114 may identify a rule set (at block 406) based on the targeted device and may then proceed to produce the command block (at blocks 408-412). In other cases, the translation engine 114 performs the operations of blocks 402-406 once for a target network device 106. For instance, when device identifying information is associated with multiple parameter configuration requests (e.g., within a configuration object), the operations of blocks 402-406 may not be repeated. For instance, continuing with the above example, blocks 402-406 may be performed once in producing the first and second command blocks 126A-B because the target network device 106N and corresponding rule set 116N may remain the same for translating both the first and second parameter configuration requests 122A-B.

In response to no parameters remaining to be configured at block 414, the translation engine 114 may, at block 416, arrange the command block(s) 126 produced for a target network device 106. In this regard, the translation engine 114 may initially produce command blocks 126 in an order different from an order of the command blocks 126 dictated by a device-specific configuration format. Accordingly, the translation engine 114 may arrange the command blocks 126 in the order dictated by the command-specific format for a target network device 106. As illustrated and described herein with respect to FIG. 1, the ordered command blocks may be included in a command block output 115.

In some cases, the translation engine 114 may determine the order for arranging command blocks 126 for configuring a set of parameters at a target network device 106 based on the rule set 116 corresponding to the device (identified at block 404). For instance, the command hierarchy 120 of the rule set 116 may dictate the order of the command blocks 126. In particular, in some cases, the translation engine 114 may generate each command block 126 by constructing a separate command tree (having a tree structure, such as tree structure 300 (FIG. 3)) for each block 126 (based on the command hierarchy 120), and the command hierarchy 120 may dictate an order between the constructed command trees. In other cases, the command trees corresponding to each command block 126 may be included as nodes on a common tree, with their position in the tree dictated by the command hierarchy 120. In such cases, the translation engine 114 may generate and order each command block 126 by traversing (e.g., depth-first) the common tree hosting the command trees.

At block 418, the networking configuration system 102 may cause the parameter(s) to be set at the target network device 106 according to the request by providing the ordered command block(s) (e.g., a command block output 115) to the target network device 106. Block 418 may be an example of the block 214 (FIG. 2) described herein. Accordingly, the operations associated with the block 418 may be performed as described herein with respect to block 214. In this regard, the network configuration device 102 may provide the ordered command block(s) 126 (e.g., a command block output 115) to the target network device 106 by outputting, via the communication interface 110, the command block(s) to the network device 106.

At block 420, the method 400 may involve determining whether the configuration request targets any remaining network devices 106. In some cases, for example, the translation engine 114 may perform the operations of blocks 402-418 to configure one or more parameters at a first target network device, such as network device 106A. At block 420, the translation engine 114 may determine whether a parameter is to be configured at an additional target network device, such as network device 106B. The translation engine may make this determination based on the configuration request 112 by, for example, determining whether the device identifying information 130 identifies any additional target network devices 106. In this regard, while block 420 and 404 are illustrated separately, the operations of these blocks may be combined or performed in parallel. Additionally or alternatively, a configuration request may include multiple configuration objects, where each object is associated with a respective target device (e.g., based on device identifying information). For instance, a configuration request may include a first configuration object having a first set of parameter configuration requests for a first target network device, and the configuration request may include a second configuration object having a second set of parameter configuration requests for a second target network device. In such cases, determining whether a target device remains may involve determining whether any configuration objects remain in the configuration request.

In response to a target network device 106 remaining to be configured at block 420, the translation engine 114 may replicate the operations of blocks 404-418 for the remaining target network device 106. As an illustrative example, in the case of a configuration request 112 targeting two network devices, the translation engine may: identify a first target network device 106A that the request is targeting (block 404); produce first command block(s) 126 having a device-specific configuration format for the first target network device 106A (at blocks 406-416); cause requested parameter (s) to be set at the first target network device 106A by providing first command block(s) 126 (at block 418); determine the second target network device 106B remains to be configured (at block 420); identify a second target network device 106B that the request 112 is targeting (block 404); produce second command block(s) 126 having a second device-specific configuration format for the second target network device (at blocks (406-416); and cause requested parameter(s) to be set at the second target network device 126B by providing command block(s) (at block 418). In some cases, the translation engine performs the operations of block 402 once across a set of multiple target network devices 106, as the same request may target each of the network devices 106 in the set. In others, the translation engine performs the operations of block 402 for each device, as different portions of a configuration request (e.g., configuration objects) may target different devices.

Figure 6:
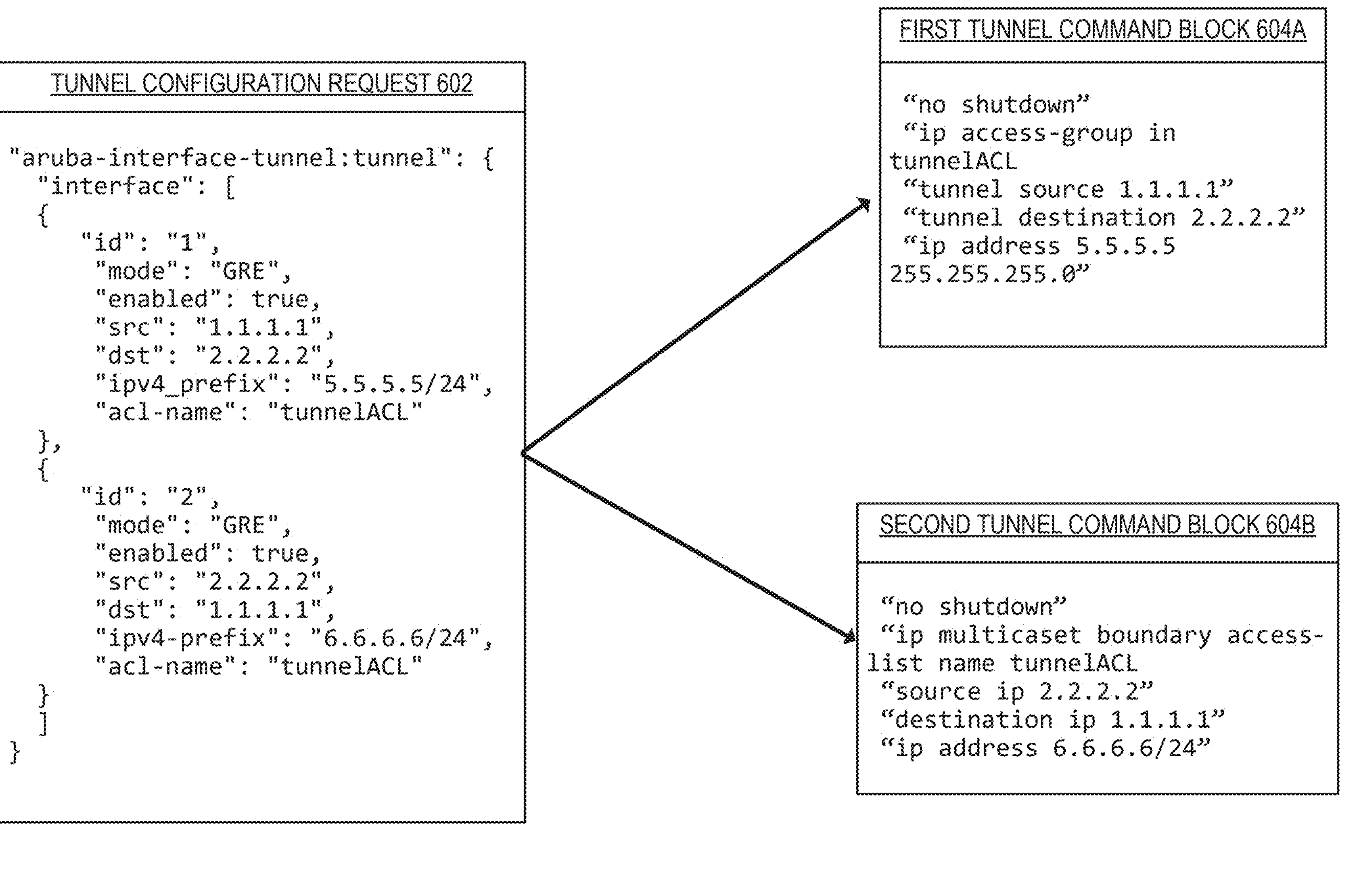
FIG. 6 depicts an example configuration request and example command blocks for setting a parameter to different values at different network devices, according to an example.

As illustrated and described in greater detail with respect to FIGS. 5-6, based on a configuration request, the translation engine 114 may produce different command blocks 126 for different target network devices 106. For instance, a command block 126 for a first target network device 106A may be in a first device-specific configuration format, while a command block 126 for a second target network device 106B may be in a different, second device-specific configuration format. These command blocks 126 may differ in terms of the commands they include and/or the order of those commands. Moreover, a particular parameter may be configured, based on a first command block 126, to a first setting at a first network device 106A and may be configured, based on a second command block 126, to a different, second setting at a second network device 106B. In addition, in some cases, a first command block 126 may cause a first parameter to be set at a first network device 106A, while a second command block 126 may omit configuration of the first parameter at a second network device 106B.

The differences between command blocks 126 provided to different network devices 106 may be dictated by the rule set 116 used to translate the configuration request for that device 106. For instance, different rule sets 116 may map to different commands, which may result in different configuration formats and/or parameter settings. Additionally or alternatively, a rule set 116 may omit a command mapping for a particular parameter, and in such cases, a command block 126 for a target network device 106 may lack a command to set that parameter, resulting in the parameter's setting being unchanged.

In response to no devices remaining to be configured at block 420, the method 420 may end. At this point, the translation engine 114 may have caused the parameters requested to be configured in the request (received at block 402) to be set appropriately at each of the network devices 106 targeted by the request (e.g., configuration request 112).

In some examples, the operations of block 418 may be performed after block 420. For instance, command blocks may be generated (at block 416) for each target device, and a command block output may be generated that includes each of these blocks. The resulting command block output may be provided to each of the target network devices to cause the parameters to be set at those devices.

FIG. 5 depicts an example configuration request for setting a common (e.g., the same) parameter at multiple different network devices, as well as example command blocks that may be produced based on this request, in accordance with the techniques and examples described herein. In particular, a firewall configuration request 502 is shown as an example of a configuration request 112. The firewall configuration request 502 may have a unified configuration format and may be a request for configuring a firewall access list on a gateway and an AP device.

A first firewall command block 504A and a second firewall command block 504B are shown as examples of a command block 126. The first firewall command block 504A includes a set of commands suitable to set a firewall access list at an AP device (e.g., a first network device), and the second firewall command block 504B includes a set of commands suitable to set a firewall access list at a gateway device (e.g., a second network device). As illustrated, the first firewall command block 504A is in a first configuration format, which is specific to the AP device (e.g., a device-specific configuration format), and the second firewall command block 504B is in a different, second configuration format. In this regard, the second firewall command block 504B differs from the first firewall command block 504B in at least one of the commands it includes and the order the commands are arranged.

In some cases, the firewall configuration request 502 may be received at a network configuration system, which, using the techniques described herein, may produce the first and second firewall command blocks 504A, 504B based on the configuration request 502. The network configuration system may provide, based on a first rule set, the first firewall command block 504A to the AP device, which may cause the firewall access list to be set at the AP device, and the network configuration system may provide, based on a second rule set, the second firewall command block 504B to the gateway device, which may cause the firewall access list to be set at the gateway device. In this way, FIG. 5 illustrates the use of a single configuration request, namely the firewall configuration request 502, to set a common parameter (the firewall access list) at multiple network devices in a single workflow and by providing commands at each device in a device-specific configuration format.

With reference now to FIGS. 6-8, FIG. 6 depicts an example configuration request for setting a parameter to different values at different network devices, as well as example command blocks that may be produced based on this request, in accordance with the techniques and examples described herein. FIG. 7 depicts an example rule set associated with the parameter, in accordance with the techniques and examples described herein. FIG. 8 depicts an example common configuration model, which may be used to generate the rule set and/or for creating an interface to receive the configuration request, in accordance with the techniques and examples described herein. In particular, a tunnel configuration request 602 is shown as an example of a configuration request 112. The tunnel configuration request 602 may have a unified configuration format and may be a request for configuring a tunnel between a switch and a gateway.

A first tunnel command block 604A and a second tunnel command block 604B are shown as examples of a command block 126. The first tunnel command block 604A includes a set of commands suitable to create a tunnel at a gateway device (e.g., a first network device), and the second tunnel command block 604B includes a set of commands suitable to create the tunnel at a switch device (e.g., a second network device). As illustrated, the first tunnel command block 604A is in a first configuration format, which is specific to the switch, and the second tunnel command block 604B is in a different, second configuration format, which is specific to the gateway. For instance, the first tunnel command block 604A may set the tunnel source with the command "tunnel source 1.1.1.1," while the second tunnel command block 604B may set the tunnel source with the command "source ip 2.2.2.2."

A rule set 708 is shown in FIG. 7 as a non-limiting example of a rule set 116 (FIG. 1). It may be appreciated that the illustrated rule set 708 may be a portion of a rule set. In this regard, while rule set 708 corresponds to sub-parameter of creating a tunnel, namely the IP address of the source of the tunnel, a rule set may include command mappings and a command hierarchy for additional sub-parameters and parameters associated with a device. Moreover, while the illustrated rule set 708 includes command mappings for multiple devices (e.g., a switch and a gateway), as described herein, in some cases, a rule set may include command mappings for a single device or device type.

In some cases, the tunnel configuration request 602 may be received at a network configuration system, which, using the techniques described herein, may produce the first and second tunnel command blocks 604A, 604B based on the tunnel configuration request 602 and the rule set 708. The network configuration system may provide the first tunnel command block 604A to the gateway device, which may create the tunnel at the tunnel device and may set the IP address for this parameter to "5.5.5.5 255.255.255.0." The network configuration system may provide the second tunnel command block 604B to the switch device, which may cause the tunnel to be created at the switch and may set the IP address for this parameter to "6.6.6.6/24.". In this way, FIGS. 6-7 illustrate the use of a single configuration request, namely the tunnel configuration request 602, to set a common parameter (the tunnel) to different settings (e.g., different IP addresses) at different network devices in a single workflow.

A rule set 708 is shown in FIG. 7 as a non-limiting example of a rule set 116 (FIG. 1). It may be appreciated that the illustrated rule set 708 may be a portion of a rule set. In this regard, while rule set 708 corresponds to sub-parameter of creating a tunnel, namely the IP address of the source of the tunnel, a rule set may include command mappings and a command hierarchy for additional sub-parameters and parameters associated with a device. Moreover, while the illustrated rule set 708 includes command mappings for multiple devices (e.g., a switch and a gateway), as described herein, in some cases, a rule set may include command mappings for a single device or device type.

A common configuration model 802 is shown in FIG. 8 as a non-limiting example of a common configuration model 117 (FIG. 1). The illustrated common configuration model 802 includes network configuration data associated with creating a tunnel, as well as translation metadata mapping configuration elements of the network configuration data to a switch and to a gateway device. In particular, the network configuration data of the common configuration model 802 includes configuration elements, such as the elements labeled "leaf" (e.g., "leaf id," "leaf enabled," "leaf src," "leaf dst," "leaf ipv4-prefix," "leaf ac-name"), arranged in a hierarchy. While the illustrated example uses the YANG modeling language, this network configuration data may be represented in any modeling language. Moreover, the common configuration model 802 includes device-specific translation metadata associated with each of these elements. For instance, the element labeled "leaf src" includes translation metadata for a switch (labeled "cmd-ext:switch") as well as translation metadata for a gateway (labeled "cmd-ext:gateway"). By associating translation metadata with each configuration element of network configuration data, the techniques described herein may be used to translate from any structured (e.g., hierarchical) modeling language, which may provide a unified configuration format, to any device-specific format, such as CLI commands, Python script, a string of text, or the like.

It may be appreciated that the illustrated common configuration model 802 may be a portion of a common configuration model. In this regard, while common configuration model 802 corresponds to creating a tunnel, a common configuration model may include network configuration data, as well as translation metadata, for any number of devices, parameters, or other network configuration elements.

As described herein, a network management system may use a common configuration model to provide an input interface for receiving a configuration request in a unified configuration format. The tunnel configuration request 602 of FIG. 6 and the common configuration model 802 of FIG. 8 provide an example of this relationship. For instance, the tunnel configuration request 602, may be formatted according to the network configuration data of the common configuration model 802. In this regard, the tunnel configuration request 602 may include the network configuration elements, such as the elements labeled "leaf" in FIG. 8, arranged in a hierarchy dictated by the common configuration model 802. The network management system may format an input interface to receive an input in this format, or the network management system may receive an input at the input interface and may map it to this format.

As further described, a common configuration model may be used to generate a rule set. The rule set 708 of FIG. 7 and the common configuration model 802 of FIG. 8 provide an example of this relationship. For instance, in some examples, a network configuration system may extract the translation metadata from the common configuration model 802 of FIG. 8 to generate the rule set 708. In particular, a network configuration system may extract the translation metadata associated with the element labeled "leaf src" to generate the rule set 708. The translation metadata for a switch (labeled "cmd-ext:switch") may be extracted into the rule set 708 for translating to a device-specific format for a switch, while the translation metadata for a gateway (labeled "cmd-ext:gateway") may be extracted into the rule set 708 for translating to a device-specific format for a gateway. The rule set 708 may further be generated with a hierarchy based on the hierarchy provided by common configuration model 802.

As further illustrated, a rule set, such as the rule set 708 shown in FIG. 7, may include machine readable code. In some cases, the rule set 708 and/or the common configuration model 802 may be written in human readable code and may be complied into machine readable code for use in the network configuration system. In some cases, for example, a computing device, such as the device described in FIG. 9, may be used to extract and compile the common configuration model 802 into a rule set for use in the network configuration system. Writing a rule set and/or a common configuration model in human readable code may improve the readability and thereby reduce errors associated with rule set creation.

Figure 9:
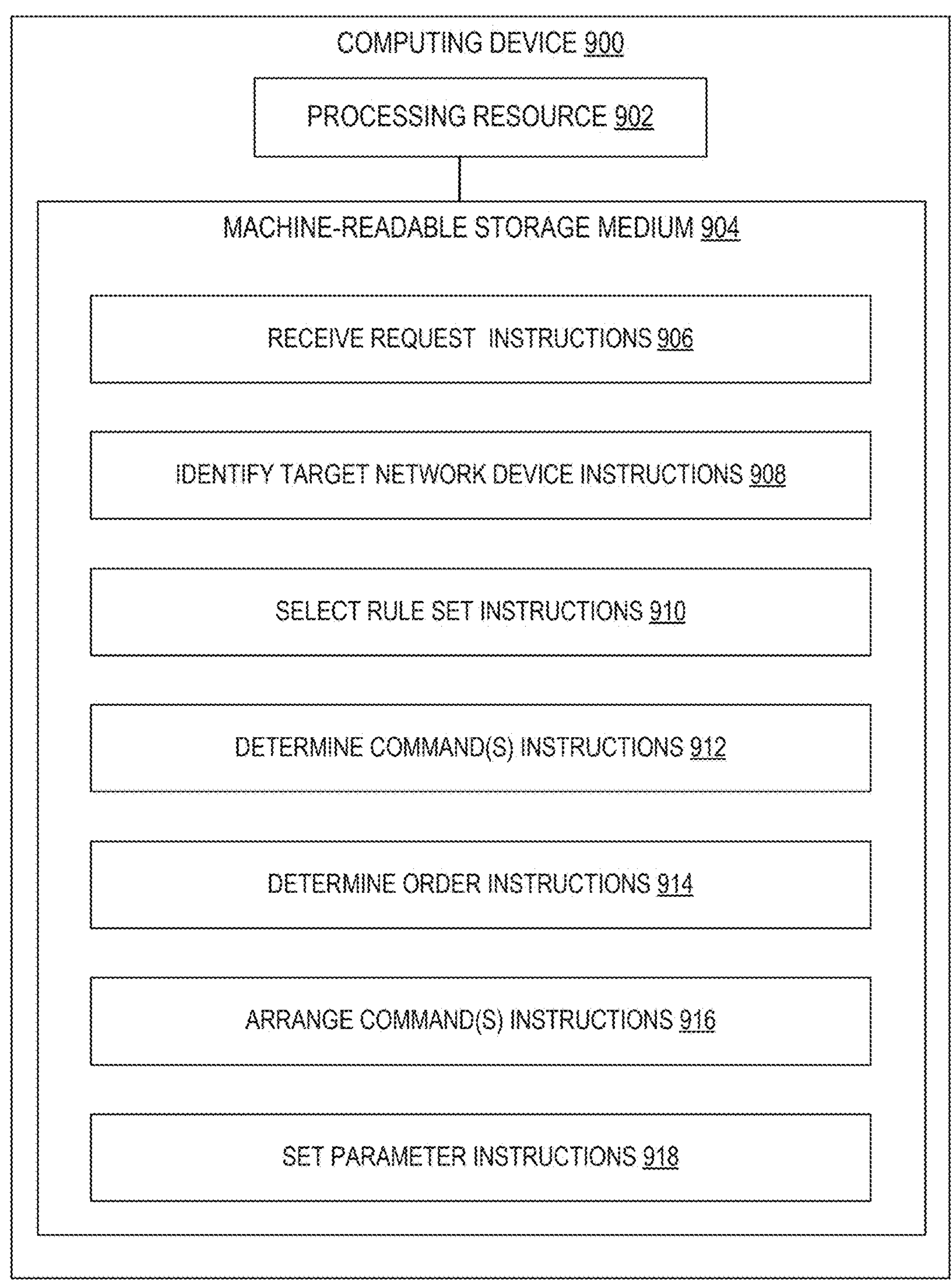
FIG. 9 is a block diagram of a computing device that includes a processing resource and a machine-readable storage medium, according to an example.

FIG. 9 is a block diagram of a computing device 900 that includes a processing resource 902 and a machine-readable storage medium 904. The computing device 900 may be an example of the network configuration system 102 (FIG. 1). The processing resource 902 may be one or more processors and may include a microprocessor, a core of a multi-core microprocessor, a microcontroller, a programmable integrated circuit, a programmable gate array, or another processing circuit.

The machine-readable storage medium 904 stores machine-readable instructions executable on processing resource 902 to perform various tasks. Machine-readable instructions executable on a processing resource can refer to instructions executable on a single processor or instructions executable on multiple processors. As described in detail herein, the machine-readable storage medium 904 may be encoded with executable instructions 906, 908, 910, 912, 914, 916, and 918 (hereinafter collectively referred to as instructions 906-918) for performing the method 200 described in FIG. 2. Although not shown, in some examples, the machine-readable storage medium 904 may be encoded with certain additional executable instructions to perform the method 400 described in FIG. 4 and/or any other operations performed by the network configuration system 102, without limiting the scope of the present disclosure. Further, machine-readable storage medium 904 may include information illustrated as being stored in the network configuration system 102 in FIG. 1, such as rule sets 116 (stored in the translation system 108) in FIG. 1.

The machine-readable storage medium 904 may include receive request instructions 906. Receive request instructions 906 may be executable by the processing resource 902 to receive a request in a unified configuration format, where the request is a request to configure a parameter of a device in a network. The request may be a configuration request, as described herein.

The machine-readable storage medium 904 may include identify target network device instructions 908, which may be instructions executable by the processing resource 902 to identify a target network device that the request is targeting.

In some cases, the identify target network device instructions 908 may include instructions executable to identify the target network device based on device identifying information, which may be included in the request.

The machine-readable storage medium 904 may include select rule set instructions 910, which may be instructions executable by the processing resource 902 to select, based on the target network device, a rule set. The rule set may include a command mapping and a command hierarchy.

The machine-readable storage medium 904 may include determine command(s) instructions 912, which may be instructions executable by the processing resource 902 to determine, based on the command mapping, a set of one or more commands usable to change a setting of the parameter at the target network device.

In some cases, the parameter may include a plurality of sub-parameters. A given command of the set of one or more commands may be usable to change a setting of a given sub-parameter of the plurality of sub-parameters of the parameter.

In some cases, the set of one or more commands includes a key of a key-value pair. In some cases, determine command(s) instructions 912 may be executable by the processing resource 902 to parse, from the request, a value for the key-value pair. The determine command(s) instructions 912 may further be executable to assign the value to the key.

In some cases, the set of one or more commands includes a set of CLI commands.

The machine-readable storage medium 904 may include determine order instructions 914, which may be instructions executable by the processing resource 902 to determine based on the command hierarchy, an order for the set of one or more commands.

In some cases, the determine order instructions 914 may include instructions executable to construct, from the set of commands and based on the command hierarchy, a command tree.

The machine-readable storage medium 904 may include arrange command(s) instructions 916, which may be instructions executable by the processing resource 902 to arrange the set of one or more commands in the determined order to produce a command block having a device-specific configuration format for the target network device.

In some cases, the arrange command(s) instructions 916 may include instructions executable to traverse the command tree depth-first.

The machine-readable storage medium 904 may include set parameter instructions 918, which may be instructions executable by the processing resource 902 to cause the parameter to be set at the target network device according to the request by providing the command block to the target network device.

In some cases, the machine-readable storage medium 904 may further include instructions executable by the processing resource 902 to identify a second target network device that the request is targeting. The instructions may also be executable to produce a second command block having a second device-specific configuration format for the second target network device and to cause the parameter to be set at the second target network device according to the request by providing the second command block to the second target network device. In some cases, the instructions may be executable to cause the parameter to be set to a first setting at the target network device and to cause the parameter to be set to a different, second setting at the second target network device. In some cases, the instructions may be executable to cause the parameter to be set to a first setting at the target network device and to cause the parameter to be set to the first setting at the second target network device. In such cases, the second command block may include a second set of commands arranged in a second order. The second set of commands may differ from the set of commands, the second order may differ from the determined order, or both.

In some cases, the machine-readable storage medium 904 may further include instructions executable by the processing resource 902 to determine the request is further to configure a second parameter. The instructions may be further executable to produce a second command block usable to change a setting of the second parameter at the target network device. The second command block may have the device-specific configuration format for the target network device. The instructions may further be executable to determine, based on the command hierarchy, a block order between the command block and the second command block and to arrange the command block and the second command block in the determined block order to produce a command block output. The instructions may further be executable to cause the parameter and the second parameter to be set at the target network device according to the request by providing the command block output to the target network device.

In some cases, the machine-readable storage medium 904 may further include instructions executable by the processing resource 902 to determine the request is further to configure a second parameter. The instructions may be executable to refrain from setting the second parameter at the target network device based on determining the command mapping lacks a command usable to change a setting of the second parameter at the target network device. In some cases, the machine-readable storage medium 904 may further include instructions executable by the processing resource 902 to identify a second target network device that the request is targeting. The instructions may further be executable to produce, based on a second rule set, a second command block usable to change the setting of the second parameter at the second target network device. The second command block may have a second device-specific configuration format for the second target network device. The instructions may be executable to cause the second parameter to be set at the second target network device according to the request by providing the second command block to the second target network device.

In some cases, the machine-readable storage medium 904 may further include instructions executable by the processing resource 902 to receive a request in a unified configuration format to configure a parameter of a device in a network. The instructions may further be executable to identify a target network device that the request is targeting and to select, based on the target network device, a rule set having a command mapping and a command hierarchy. The instructions may further be executable to determine, based on the command mapping, a set of one or more commands usable to change a setting of the parameter at the target network device and to construct, from the set of one or more commands and based on the command hierarchy, a command tree. The instructions may be executable to determine, based on the command tree, an order for the set of one or more commands and to arrange the set of one or more commands in the determined order to produce a command block having a device-specific configuration format for the target network device. The instructions may be executable to cause the parameter to be set at the target network device according to the request by providing the command block to the target network device.

In some cases, the machine-readable storage medium 904 may further include instructions executable by the processing resource 902 to determine the request is further to configure a second parameter and to determine, based on the command mapping, a second set of one or more commands usable to change a setting of the second parameter at the target network device. The instructions may be further executable to arrange, based on the command hierarchy, the second set of one or more commands on the command tree and to produce, based on the command tree, a command block output comprising the command block ordered relative to a second command block. The second command block may be in the device-specific configuration format and may be usable to change a setting of the second parameter at the target network device. The instructions may further be executable to cause the parameter and the second parameter to be set at the target network device according to the request by providing the command block output to the target network device.

In some cases, the machine-readable storage medium 904 may further include instructions executable by the processing resource 902 to receive a request in a unified configuration format to configure a parameter of a device in a network and to identify a target network device that the request is targeting. The instructions may further be executable to select, based on the target network device, a rule set having a command mapping and a command hierarchy and to parse, based on the command mapping, a value for a setting of the parameter from the request. The instructions may further be executable to determine, based on the command mapping and the value, a set of one or more commands usable to change the setting of the parameter to the value at the target network device and to determine, based on the command hierarchy, an order for the set of one or more commands. The instructions may further be executable to arrange the set of one or more commands in the determined order to produce a command block having a device-specific configuration format for the target network device and to cause the parameter to be set at the target network device according to the request by providing the command block to the target network device.

In some cases, the machine-readable storage medium 904 may further include instructions executable by the processing resource 902 to parse the value based on determining the command mapping includes a placeholder for the setting. In some cases, the machine-readable storage medium 904 may further include instructions executable to, to determine the set of one or more commands, assign the value to the placeholder.

As used herein, a "computing device" may be a server, storage device, storage array, backup appliance, desktop or laptop computer, switch, router, or any other processing device or equipment including at least one processing resource.

A machine-readable storage medium 904 can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions executable by at least one processing resource of a network configuration system to:

receive a request in a unified configuration format, the request to configure a parameter of a device in a network;

identify a target network device that the request is targeting;

select, based on the target network device, a rule set comprising a command mapping and a command hierarchy;

determine, based on the command mapping, a set of one or more commands usable to change a setting of the parameter at the target network device;

determine, based on the command hierarchy, an order for the set of one or more commands;

arrange the set of one or more commands in the determined order to produce a command block having a device-specific configuration format for the target network device; and cause the parameter to be set at the target network device according to the request by providing the command block to the target network device.

2. The non-transitory machine-readable storage medium of claim 1, further comprising instructions executable to:

identify a second target network device that the request is targeting;

produce a second command block having a second device-specific configuration format for the second target network device; and cause the parameter to be set at the second target network device according to the request by providing the second command block to the second target network device.

3. The non-transitory machine-readable storage medium of claim 2, further comprising instructions executable to:

cause the parameter to be set to a first setting at the target network device; and cause the parameter to be set to a different, second setting at the second target network device.

4. The non-transitory machine-readable storage medium of claim 2, further comprising instructions executable to:

cause the parameter to be set to a first setting at the target network device; and cause the parameter to be set to the first setting at the second target network device.

5. The non-transitory machine-readable storage medium of claim 4, wherein the second command block includes a second set of one or more commands arranged in a second order, and wherein at least one of:

the second set of one or more commands differs from the set of one or more commands; or the second order differs from the determined order.

6. The non-transitory machine-readable storage medium of claim 1, wherein the parameter comprises a plurality of sub-parameters, wherein a given command of the set of one or more commands is usable to change a setting of a given sub-parameter of the plurality of sub-parameters.

7. The non-transitory machine-readable storage medium of claim 1, further comprising instructions executable to:

determine the request is further to configure a second parameter;

produce a second command block usable to change a setting of the second parameter at the target network device, the second command block having the device-specific configuration format for the target network device;

determine, based on the command hierarchy, a block order between the command block and the second command block;

arrange the command block and the second command block in the determined block order to produce a command block output; and cause the parameter and the second parameter to be set at the target network device according to the request by providing the command block output to the target network device.

8. The non-transitory machine-readable storage medium of claim 1, wherein the instructions to determine the order of the set of one or more commands comprise instructions executable to:

construct, from the set of one or more commands and based on the command hierarchy, a command tree.

9. The non-transitory machine-readable storage medium of claim 8, wherein the instructions to arrange the set of one or more commands in the determined order comprise instructions executable to:

traverse the command tree depth-first.

10. The non-transitory machine-readable storage medium of claim 1, wherein the set of one or more commands comprises a key of a key-value pair, and wherein the instructions to determine the set of one or more commands comprise instructions executable to:

parse, from the request, a value for the key-value pair; and assign the value to the key.

11. The non-transitory machine-readable storage medium of claim 1, wherein the request comprises device identifying information, and further comprising instructions executable to:

identify the target network device based on the device identifying information.

12. The non-transitory machine-readable storage medium of claim 1, wherein the set of one or more commands comprises a set of command line interface (CLI) commands.

13. The non-transitory machine-readable storage medium of claim 1, further comprising instructions executable to:

determine the request is further to configure a second parameter;

refrain from setting the second parameter at the target network device based on determining the command mapping lacks a command usable to change a setting of the second parameter at the target network device.

14. The non-transitory machine-readable storage medium of claim 13, further comprising instructions executable to:

identify a second target network device that the request is targeting;

produce, based on a second rule set, a second command block usable to change the setting of the second parameter at the second target network device, the second command block having a second device-specific configuration format for the second target network device; and cause the second parameter to be set at the second target network device according to the request by providing the second command block to the second target network device.

15. A system comprising:

at least one processing resource; and a non-transitory machine-readable storage medium comprising instructions executable by the at least one processing resource to:

receive a request in a unified configuration format, the request to configure a parameter of a device in a network;

identify a target network device that the request is targeting;

select, based on the target network device, a rule set comprising a command mapping and a command hierarchy;

determine, based on the command mapping, a set of one or more commands usable to change a setting of the parameter at the target network device;

construct, from the set of one or more commands and based on the command hierarchy, a command tree;

determine, based on the command tree, an order for the set of one or more commands;

arrange the set of one or more commands in the determined order to produce a command block having a device-specific configuration format for the target network device; and cause the parameter to be set at the target network device according to the request by providing the command block to the target network device.

16. The system of claim 15, the non-transitory machine-readable storage medium further comprising instructions executable to:

determine the request is further to configure a second parameter;

determine, based on the command mapping, a second set of one or more commands usable to change a setting of the second parameter at the target network device;

arrange, based on the command hierarchy, the second set of one or more commands on the command tree;

produce, based on the command tree, a command block output comprising the command block ordered relative to a second command block, the second command block having the device-specific configuration format and usable to change a setting of the second parameter at the target network device; and cause the parameter and the second parameter to be set at the target network device according to the request by providing the command block output to the target network device.

17. The system of claim 15, the non-transitory machine-readable storage medium further comprising instructions executable to:

identify a second target network device that the request is targeting;

produce, based on a second rule set, a second command block having a second device-specific configuration format for the second target network device; and cause the parameter to be set at the second target network device according to the request by providing the second command block to the second target network device.

18. A method comprising:

receiving a request in a unified configuration format, the request to configure a parameter of a device in a network;

identifying a target network device that the request is targeting;

selecting, based on the target network device, a rule set comprising a command mapping and a command hierarchy;

parsing, based on the command mapping, a value for a setting of the parameter from the request;

determining, based on the command mapping and the value, a set of one or more commands usable to change the setting of the parameter to the value at the target network device;

determining, based on the command hierarchy, an order for the set of one or more commands;

arranging the set of one or more commands in the determined order to produce a command block having a device-specific configuration format for the target network device; and causing the parameter to be set at the target network device according to the request by providing the command block to the target network device.

19. The method of claim 18, further comprising parsing the value based on determining the command mapping comprises a placeholder for the setting.

20. The method of claim 19, wherein determining the set of one or more commands comprises:

assigning the value to the placeholder.

* * * * *